(12) United States Patent
Fujieda

(10) Patent No.: US 7,408,135 B2
(45) Date of Patent: Aug. 5, 2008

(54) IMAGING DEVICE HAVING DUAL OPENING WITH OPEN/CLOSE UNIT AND ELECTRONIC EQUIPMENT INCORPORATED THEREIN THE SAME

(75) Inventor: Ichiro Fujieda, Tokyo (JP)

(73) Assignee: NEC Corporation, Tokyo (JP)

( * ) Notice: Subject to any disclaimer, the term of this patent is extended or adjusted under 35 U.S.C. 154(b) by 1313 days.

(21) Appl. No.: 10/252,407

(22) Filed: Sep. 24, 2002

(65) Prior Publication Data

US 2003/0062490 A1  Apr. 3, 2003

(30) Foreign Application Priority Data

Sep. 28, 2001  (JP)  ............... 2001-302246

(51) Int. Cl.
*H01L 27/00* (2006.01)
(52) U.S. Cl. .................... 250/208.1; 250/239
(58) Field of Classification Search ........... 250/556, 250/208.1, 239, 214 R, 216; 382/124; 283/68; 356/71; 455/575.1

See application file for complete search history.

(56) References Cited

U.S. PATENT DOCUMENTS 5,874,993 A * 2/1999 Ciccarelli et al. ........... 348/294
6,177,950 B1 * 1/2001 Robb ...................... 348/14.01
6,553,134 B1 * 4/2003 Amano et al. ............... 382/124
2002/0003892 A1 * 1/2002 Iwanaga .................... 382/124
2003/0016848 A1 * 1/2003 Kitajima et al. ............. 382/124

FOREIGN PATENT DOCUMENTS

JP  2001-142606  *  5/2001
JP  2001-142606 A    5/2001

OTHER PUBLICATIONS

I. Fujieda et al., "Development of Pen-shaped Scanners", NEC Technical Journal, vol. 51, No. 10, (1998), pp. 90-95.

* cited by examiner

*Primary Examiner*—Que T Le
(74) *Attorney, Agent, or Firm*—Sughrue Mion, PLLC

(57) ABSTRACT

A first housing is provided so as to be able to rotate with respect to a second housing and a first and second openings are provided in the first housing. Within the first housing are provided an image pickup device having a plurality of photosensitive elements therein arranged on one face of a transparent substrate, a surroundings imaging lens system fixed to the first opening and disposed on the side of the transparent substrate of the image pickup device, a fiber collection member fixed to the second opening and bonded to the side of the photosensitive elements of the image pickup device via an adhesion layer, and a light emitting element. In addition, a light absorbing face is formed in a surface of the second housing, which becomes in contact with the first housing.

21 Claims, 14 Drawing Sheets

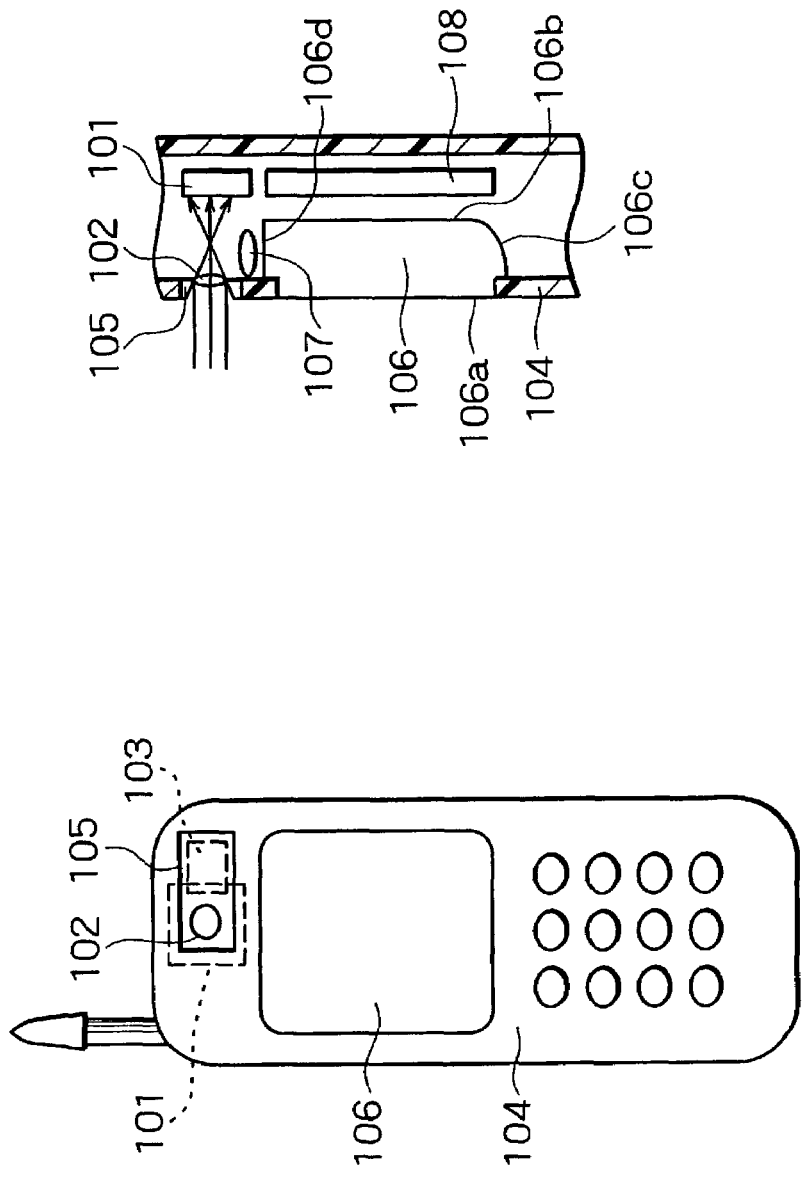

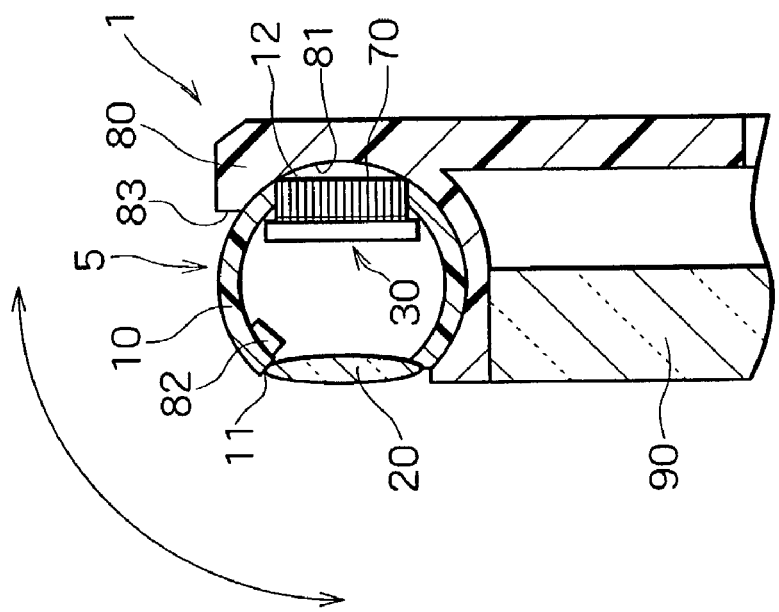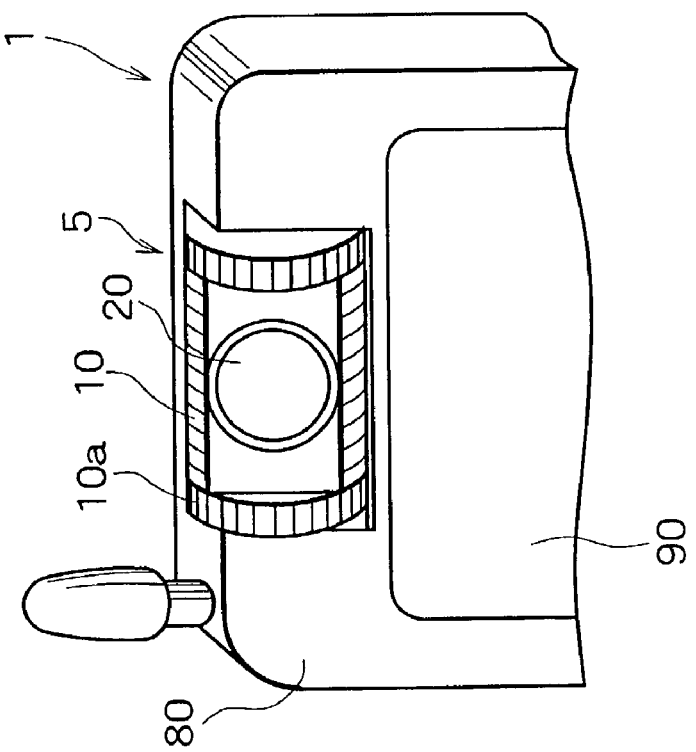

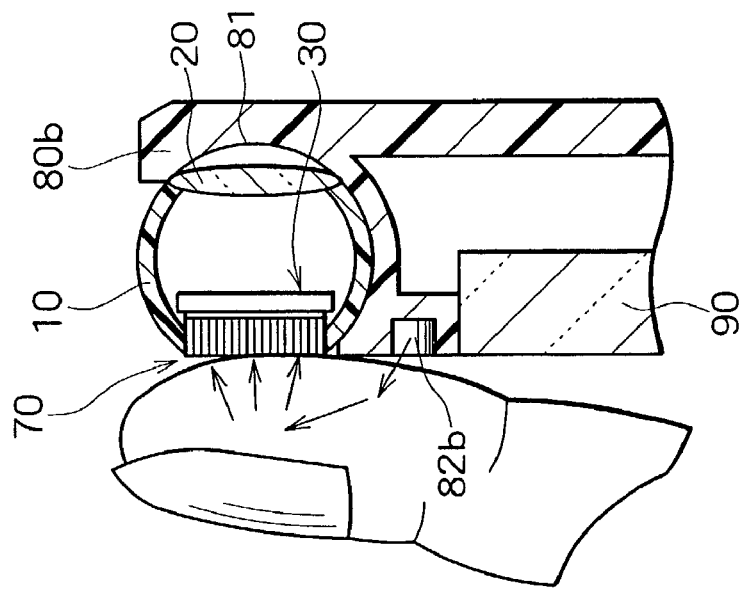
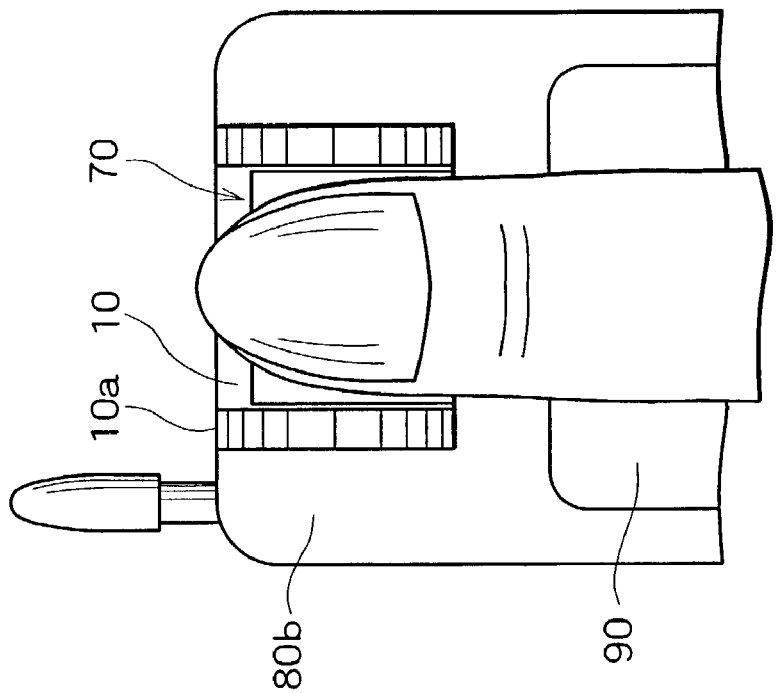
FIG. 13A
FIG. 13B

IMAGING DEVICE HAVING DUAL OPENING WITH OPEN/CLOSE UNIT AND ELECTRONIC EQUIPMENT INCORPORATED THEREIN THE SAME

BACKGROUND OF THE INVENTION

1. Field of the Invention

The present invention relates to an imaging device suitably incorporated within an electronic equipment such as a portable telephone, a personal digital assistance and a notebook personal computer, and an electronic equipment incorporating therein the imaging device. More particularly, it relates to an imaging device capable of imaging both surrounding distant views such as a landscape and a person, and close views such as a fingerprint and a validating signature, and an electronic equipment incorporating therein the imaging device.

2. Description of the Related Art

Some electronic equipments such as a portable telephone, a personal digital assistance and a notebook personal computer incorporate therein an imaging device for capturing the image of the surroundings such as a landscape and a person. Furthermore, for purpose of prevention of leakage of information stored within an electronic equipment and identity verification of a person seeking authentication at an electronic business transaction, an electronic equipment is required to incorporate therein a device for capturing a user's fingerprint as an image to verify a person seeking authentication.

Conventionally, an electronic equipment has been known which is capable of capturing both the image of distant views (hereinafter, referred to as the surroundings) such as a landscape and a person, and the image of close views such as a fingerprint or the like (hereinafter, referred to as a fingerprint) using the same image pickup device. Such an electronic equipment includes two independent focus optical systems therein and is configured to mechanically select a focus optical system that should receive light and deliver light from the surroundings or a fingerprint to the image pickup device. Particularly, for a portable electronic equipment whose volume and manufacturing cost of device are considered relatively critical, achieving the ability to image the surroundings such as a landscape and a person, and in addition, verify a person seeking authentication via a fingerprint by using the same image pickup device has a large meaning.

Japanese Patent Application Laid-open 2001-142606 discloses an example of such kind of electronic equipment. FIGS. 1A and 1B respectively are a front view and a cross sectional view of such conventional electronic equipment, showing operation for imaging the surroundings. FIGS. 2A and 2B respectively are a front view and a cross sectional view of such conventional electronic equipment, showing operation for imaging a fingerprint. As shown in FIGS. 1A and 1B, the electronic equipment is a portable telephone having a surroundings imaging lens system (hereinafter, it represents a lens system for imaging the surroundings) 102, a switch section 105 and a finger rest prism (hereinafter, it represents a prism on which a finger rests) 106 made of a transparent material, all of which are provided in a housing 104. A mirror 103 is mounted in the switch section 105 that is made to slide in left or right direction to switch imaging modes.

The finger rest prism 106 has a finger rest face 106a facing the outside of the housing 104 and a prism bottom face 106b formed opposite the finger rest face 106a, and a reflecting face 106c and a lens system fixing face 106d are formed between the finger rest face 106a and the prism bottom face 106b. Within the housing 104 are provided an image pickup device 101 such as a CCD, a fingerprint imaging lens system 107 and a display 108 such as a liquid crystal display, and the display 108 is disposed to face the prism bottom face 106b, and further, the fingerprint imaging lens system 107 is fixed to the lens system fixing face 106d. When the switch section 105 is positioned on one side out of the two sides, light from the surroundings is focused onto the image pickup device 101 passing through the surrounding imaging lens system 102. In this case, the switch section 105 is positioned so as to make the mirror 103 positioned outside a light path. Furthermore, when the switch section 105 is positioned on the other side, light incident on the finger rest prism 106 passes through the fingerprint imaging lens system 107 and is reflected by the mirror 103 to thereby be focused onto the image pickup device 101.

The operation of the electronic equipment for imaging the surroundings will be described below. As shown in FIG. 1A, when the switch section 105 is made to slide to the right side in the figure, light from the surroundings is collected by the surroundings imaging lens system 102 and focused onto the image pickup device 101, as shown in FIG. 1B. Thus, the image of the surroundings is captured by the image pickup device 101. Thereafter, the captured image of the surroundings is displayed on the display 108 and then, the captured image can be viewed from outside since the finger rest prism 106 is made of a transparent material.

Subsequently, the operation of the electronic equipment for imaging the fingerprint will be described below. First, as shown in FIG. 2A, the switch section 105 is made to slide to the left side in the figure. Then, as shown in FIGS. 2A and 2B, a finger is made to tightly rest on the finger rest face 106a of the finger rest prism 106. Keeping this state of the finger, the display 108 is made to uniformly emit light and the finger tightly resting on the finger rest face 106a is illuminated. The light scattered by the finger is reflected by the reflecting face 106c of the finger rest prism 106 and passes through the lens system fixing face 106d and further the fingerprint imaging lens system 107, and then, is reflected by the mirror 103, and finally is focused onto the image pickup device 101. After the image of the fingerprint is captured by the image pickup device 101 as described above, the captured image is displayed on the display 108 and then, the captured image can be viewed from outside since the finger rest prism 106 is made of a transparent material. Furthermore, since the display 108 can show a graphic symbol indicating a profile of the finger and a message, for example, "Put a finger here" when a fingerprint is imaged, a user is able to put his/her finger on a previously determined position and therefore, the imaging device is securely able to image a specific portion of the fingerprint.

As described above, the conventional electronic equipment disclosed in Japanese Patent Application Laid-open 2001-142606 has two focus optical systems therein respectively for imaging the surroundings and a fingerprint and is configured to mechanically switch lights respectively passing through both systems so as to allow one of the lights to pass through one of the two focus optical systems to deliver the corresponding light to an image pickup device, thereby enabling the equipment to capture both images of the surroundings and a fingerprint using the same image pickup device.

It should be noted that the inventors of this application developed an optical system named "SOFI (Single Optical Fiber Imaging" in the past and disclosed it in the publication "NEC TECHNICAL JOURNAL Vol. 51, No. 10 pp. 90-95 (1998) 'Development of a pen-shaped scanner and its applications'." The SOFI optical system has been developed to realize a hand-held scanner configured to trace a document and input the corresponding data to a computer.

The SOFI optical system has a light source, a glass substrate, an image sensor and an optical fiber array. The glass substrate is disposed in a location on which light from the light source is incident. The image sensor is disposed on a surface of the glass substrate opposite the surface thereof that faces the light source. And the optical fiber array is provided to face the image sensor. The image sensor has a window being passed light through and a plurality of pixels. The optical fiber array has a plurality of optical fibers. And the light from the light source transmits through the glass substrate and the window to enter the plurality of optical fibers.

The SOFI optical system operates as follows. First, a document to be read is made in contact with the optical fiber array and keeping this state of the document, the light source is made to emit light. Light emitted from the light source transmits through the glass substrate, the window formed on the pixels and the optical fibers in this order to illuminate the document. Light reflected from the document enters the optical fibers through which the illumination light has transmitted and then, enters the image sensor. Thus, the SOFI optical system acquires the image of the document. Although the SOFI optical system has been developed for reading a document, it may also be used as an imaging device for imaging a fingerprint.

However, the above-described conventional technique includes the following problems. First, the electronic equipment disclosed in Japanese Patent Application Laid-open 2001-142606 includes components having a large volume therein for imaging an object and therefore, the equipment is forced to increase its volume. That is, the above-described conventional electronic equipment has two independent focus optical systems provided therein each for imaging the surroundings and a fingerprint, and therefore, distances needed to focus the respective images onto the image pickup device have to individually be secured between the corresponding lens and the image pickup device. In addition, in order to switch the two focus optical systems, the electronic equipment needs physical space for making the switch section slide in left or right direction to switch imaging modes. As is mentioned above, the electronic equipment disclosed in Japanese Patent Application Laid-open 2001-142606 is unfavorably forced to increase its volume.

Secondly, the electronic equipment disclosed in Japanese Patent Application Laid-open 2001-142606 is configured to make a user view the display through the finger rest prism. Therefore, the user feels it difficult to view a displayed image since the image is deeply located behind the prism. In addition, when capturing the image of fingerprint, oil on a finger surface adheres to the finger rest prism, deteriorating the image to be displayed. As described above, the conventional electronic equipment includes the drawbacks. That is, a user forcibly feels the image displayed on the display is deeply located within the equipment and the residual fingerprint image left on the finger rest prism deteriorates the image to be displayed.

Thirdly, when capturing the image of the surroundings such as a landscape or a person, it is desirable to be able to capture the image of the surroundings in a number of directions in which the electronic equipment is moved regardless of orientation of the electronic equipment. However, since the above-described conventional electronic equipment has the focus optical system fixed to the housing of the equipment for imaging the surroundings, the equipment is able to image an object only in one specific direction in which the equipment is aimed. As described above, the conventional electronic equipment includes the problems. That is, degree of freedom in selecting directions in which the equipment is moved to capture the image of the surroundings is small.

Furthermore, the above-described imaging device employing SOFI optical system therein includes the problems. That is, although the imaging device is able to capture the image of fingerprint, it is not able to capture the image of the surrounding.

SUMMARY OF THE INVENTION

An object of the present invention is to provide an imaging device capable of capturing both the image of the surroundings and the image of a fingerprint or the like, in which the volume of imaging device is reduced and the ability of imaging device to display an image is free from deterioration, and degree of freedom in selecting directions in which the equipment is moved to capture the image of the surroundings is large, and further, to provide an electronic equipment incorporating therein the imaging device.

An imaging device constructed in accordance with the present invention has a first housing having a first and second openings provided therein, open/close unit for selecting one of the first and second openings to open the one of the first and second openings, focus optical unit for focusing light having passed therethrough onto an image plane when the first opening is open, a plurality of photosensitive elements arranged in an orderly fashion for detecting light focused onto an image plane using the focus optical unit, and contact-type imaging unit (the unit also serves as unit on which an object to be imaged is made to tightly rest) for allowing light having passed through the second opening to enter the plurality of photosensitive elements when the second opening is open.

In the present invention, when capturing the image of the surroundings, the open/close unit opens the first opening and light from the surroundings is incident on the focus optical unit, and the focus optical unit focuses the light onto the location of the photosensitive elements. Thus, the photosensitive elements are able to detect light from the surroundings. When imaging a fingerprint or the like, the open/close unit opens the second opening and the fingerprint or the like is disposed in contact with the contact-type imaging unit, and light from the fingerprint or the like reaches the photosensitive elements. Thus, the photosensitive elements are able to detect light from the fingerprint or the like. As described above, the imaging device is able to capture two kinds of images of the objects, i.e., the surroundings and a fingerprint or the like, using only one image pick-up device, and therefore, reduces its volume.

Furthermore, the open/close unit may be a second housing having a third opening for housing and rotatably supporting the first housing. And, the one of the first and second openings may be opened by making the first housing rotate so as to align a location of the one of the first and second openings with a location of the third opening. This construction of the imaging device makes it possible to realize the open/close unit by employing a simplified mechanism. And further, in a case where the imaging device is incorporated within an electronic equipment, the electronic equipment is able to move the focus optical unit in a desired direction with respect to the second housing. Therefore, the imaging device is made be able to capture the image of the surroundings in a number of directions regardless of orientation of the electronic equipment.

Moreover, the imaging device of the present invention may be constructed such that a portion of the open/close unit positioned to close one of the first opening and the second opening is formed of a material capable of absorbing light.

This construction of imaging device makes it possible to prevent light from being reflected toward a position inside the opening being closed, thereby eliminating influence on light incident through the opening being opened. As a result, the imaging device of the present invention is able to capture an image with higher accuracy.

Additionally, the contact-type imaging unit may have a plurality of optical fibers. And further, the contact-type imaging unit may have a reflecting section for reflecting light emitted from the focus optical unit toward the plurality of photosensitive elements. The reflecting section may be a metal film formed partially on an end portion, where is positioned on a side of the focus optical unit, of the contact-type imaging unit.

Furthermore, the imaging device of the present invention may have reflection/transmission switch unit. The reflection/transmission switch unit switches operations for reflecting light emitted from the focus optical unit to make the light reach the plurality of photosensitive elements and transmitting light emitted from the focus optical unit through the reflection/transmission switch unit to make the light reach the contact-type imaging unit. The reflection/transmission switch unit may have two transparent electrodes disposed in parallel with each other and a chiral nematic liquid crystal layer disposed between the two transparent electrodes. This construction of imaging device makes it possible to increase reflectance of the reflection/transmission switch unit when imaging the surroundings and increase transmittance of the reflection/transmission switch unit when imaging a fingerprint or the like, thereby improving the usability of light regardless of whether the surroundings or a fingerprint is imaged and increasing quality of an image to be captured.

In addition, the imaging device of the present invention may preferebly have a color filter disposed between the contact-type imaging unit and the plurality of photosensitive elements. This construction of imaging device makes it possible to detect only a monochrome light through each of the photosensitive elements. Accordingly, forming a plurality of color filters representing a plurality of colors in an imaging device to detect lights corresponding to the plurality of colors makes it possible to capture a colored image.

Moreover, the imaging device of the present invention is preferably constructed such that the plurality of photosensitive elements are divided into a plurality of groups, each group corresponding to one group of locations of the plurality of photosensitive elements, and one of operations for making photosensitive elements belonging to all of the plurality of groups detect light and making photosensitive elements belonging to one of the plurality of groups detect light can be selected. This construction of imaging device makes it possible to make only the photosensitive elements by which the image of the surroundings is captured detect light even in a case where distance between the focus optical unit and the photosensitive elements is made short to further reduce the volume of the imaging device.

Furthermore, the imaging device of the present invention may have a light emitting element provided within the first housing, in which light emitted from the light emitting element transmits through the contact-type imaging unit to illuminate an object to be imaged and light reflected by the object transmits through the contact-type imaging unit to be detected by the plurality of photosensitive elements. This construction of imaging device makes it possible to image an object such as a fingerprint with high accuracy.

Alternatively, the imaging device of the present invention may have a light emitting element provided in one of an outer face of the first housing and an outer face of the second housing, in which light emitted from the light emitting element is incident on an object to be imaged and light reflected or scattered by the object transmits through the contact-type imaging unit to be detected by the plurality of photosensitive elements. This construction of imaging device makes it possible to eliminate necessity to provide a light emitting element within the first housing, further reducing the volume of the first housing.

An electronic equipment of the present invention is characterized in that the electronic equipment incorporates therein the above-described imaging device.

The electronic equipment of the present invention may be a portable telephone, a personal digital assistance or a notebook personal computer.

The electronic equipment of the present invention may alternatively have a display unit for displaying an image and in addition, emitting light, in which light emitted from the display unit is incident on an object to be imaged and light reflected or scattered by the object transmits through the contact-type imaging unit to be detected by the plurality of photosensitive elements. The electronic equipment constructed as described above does not need to have a dedicated light emitting element provided therein, thereby reducing the volume and manufacturing cost of the electronic equipment.

As described above, the present invention realizes an imaging device exhibiting the following advantages and an electronic equipment incorporating therein the imaging device. That is, the imaging device is able to capture both the image of the surroundings and the image of a fingerprint or the like, in which the volume of imaging device is reduced and the ability of imaging device to display an image is free from deterioration, and degree of freedom in selecting directions in which the imaging device is moved to capture the image of the surroundings is large.

BRIEF DESCRIPTION OF THE DRAWINGS

FIG. 1A is a front view showing a conventional electronic equipment and FIG. 1B is a cross sectional view thereof, showing how the surroundings are imaged;

FIG. 3A is a perspective view showing an electronic equipment of a first embodiment of the present invention and FIG. 3B is a cross sectional view thereof;

FIG. 13A is a front view showing how operation for capturing the image of fingerprint is performed in the fourth embodiment and FIG. 13B is a cross sectional view showing how operation for capturing the image of fingerprint is performed.

DETAILED DESCRIPTION OF PREFERRED EMBODIMENTS

Figure 2A:
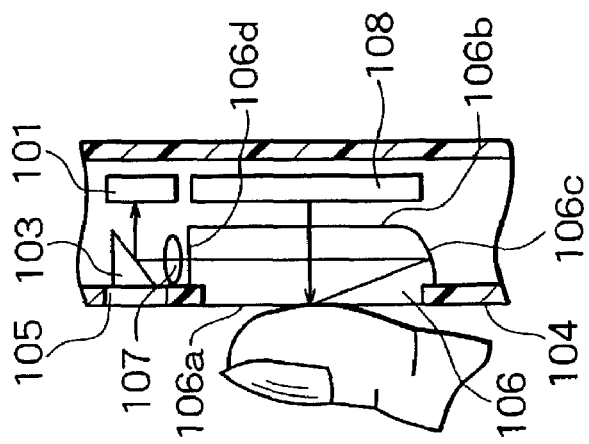
FIG. 2A is a front view showing the conventional electronic equipment and FIG. 2B is a cross sectional view thereof, showing how a fingerprint is imaged.
Figure 2B:
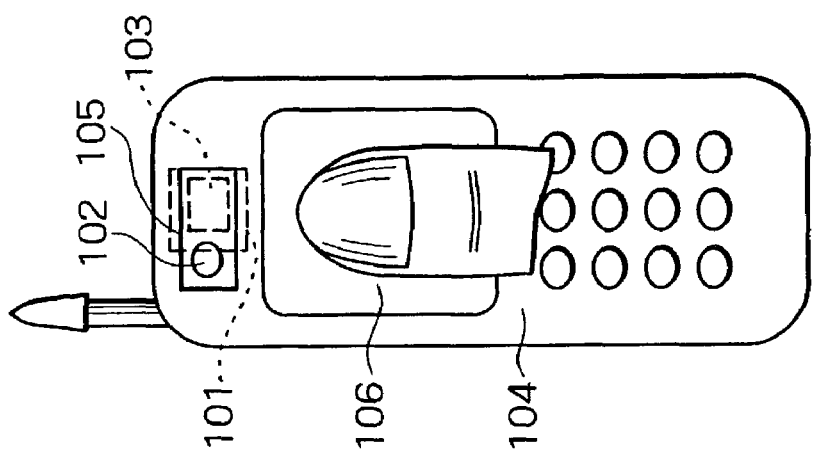
Figure 4:
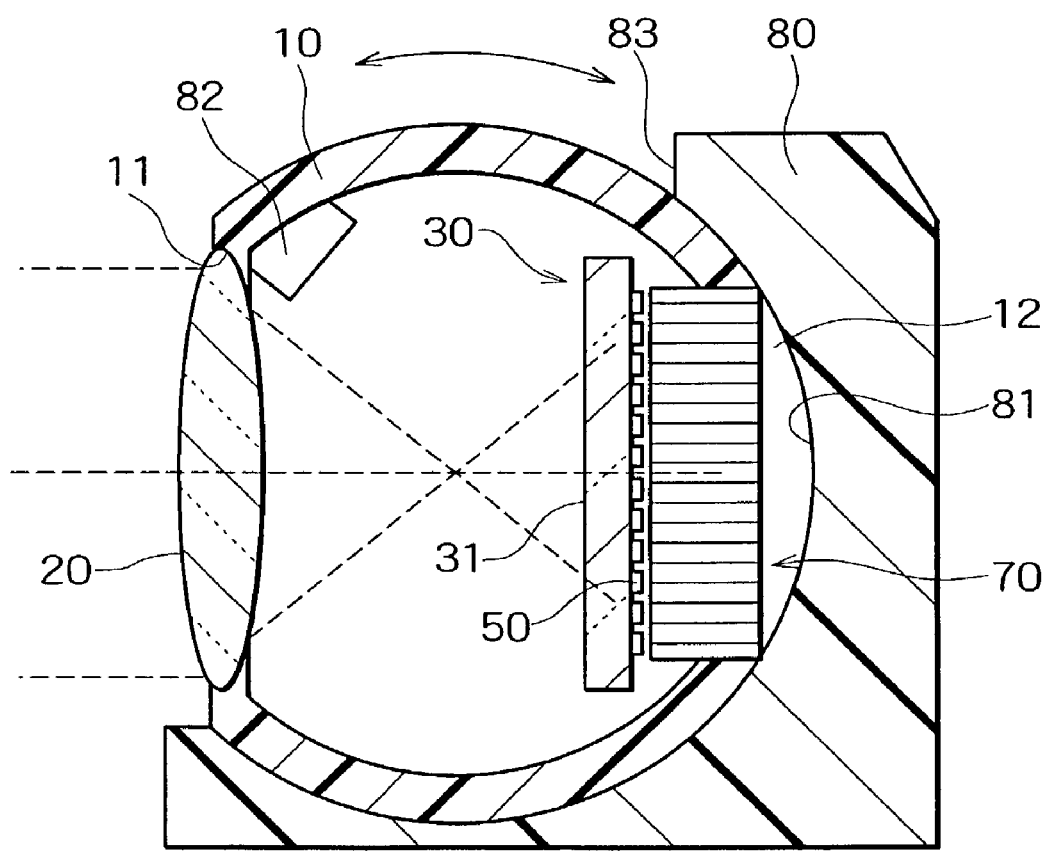
FIG. 4 is an enlarged cross sectional view showing an imaging device shown in FIG. 3B.

Embodiments of the present invention will be explained in detail below with reference to the attached drawings. First, a first embodiment of the present invention will be explained. FIG. 3A is a perspective view showing an electronic equipment of the embodiment, FIG. 3B is a cross sectional view thereof, FIG. 4 is an enlarged cross sectional view showing the imaging device shown in FIG. 3B, FIG. 5A is a plan view showing a photosensitive element of the imaging device of the embodiment and the vicinity thereof, FIG. 5B is a plan view showing an end face of a fiber collection member, and FIG. 5C is a view obtained by overlapping FIG. 5A and FIG. 5B each other. Furthermore, FIG. 6 is a cross sectional view showing an area image sensor and the fiber collection member of the imaging device of the embodiment, and FIGS. 7A and 7B respectively a front view and a cross sectional view showing how operation for capturing the image of fingerprint is performed in the electronic equipment of the embodiment.

As shown in FIGS. 3A and 3B, an electronic equipment of the embodiment is concretely a portable telephone 1 mounting an imaging device 5 in an end portion thereof. The imaging device 5 has a housing 10 and a housing 80 provided therein. In the embodiment, the housing 80 of the imaging device 5 also serves as a housing of the portable telephone 1. The portable telephone 1 has a thin display 90 such as a liquid crystal display provided therein and fixed to the housing 80. In addition, in the housing 80 is formed an opening 83.

The housing 10 is shaped like a cylinder having openings 11 and 12 formed in the side faces thereof and further, is rotatably supported by the housing 80, and the housing 10 rotates around the axis of the housing 10. Although the embodiment may employ a motor or the like as a drive source therein for rotating the housing 10, the embodiment employs indentation sections 10a provided in the end portions of the housing 10 for manually rotating the housing 10 by moving the indentation section(s) 10a using a finger, as shown in FIG. 3A. This is because operation for manually rotating the housing 10 excludes the necessity of a motor or the like to advantageously contribute to reducing a space required to assemble an electronic equipment and further, manufacturing cost and power consumption of the electronic equipment. Rotating the housing 10 makes the location of the opening 11 or 12 aligned with the location of the opening 83, thereby allowing the opening 11 or 12 to be opened. Note that the imaging device is constructed such that when opening the opening 11, the housing 80 covers opening 12 to resultantly close the opening 12 and when opening the opening 12, the housing 80 covers the opening 11 to resultantly close the opening 11. The housing 10 includes later described electronic parts therewithin. Electrical wiring (not shown) for supplying power and a control signal to those parts connects together the electronic parts provided within the housing 10 and electronic parts (not shown) provided within the housing 80.

As shown in FIG. 4, the housing 10 has the openings 11 and 12 provided in two portions thereof and the opening 11 has a surroundings imaging lens system 20 mounted therewithin, and the opening 12 has a fiber collection member 70 mounted therewithin. Within the housing 10 is fixed a light emitting element 82 and to the end of the fiber collection member 70 is bonded to an area image sensor 30 via an adhesion layer 59 (refer to FIG. 6). The area image sensor 30 is formed such that a plurality of photosensitive elements 50 are arranged in an orderly fashion and in a matrix on one surface of a transparent substrate 31. The fiber collection member 70 is constructed such that a number of optical fibers are bundled and fused together, and cut in a direction perpendicular to the direction in which the optical fibers extend and then, the cut faces of the optical fibers are polished, thereby constituting optical unit for transmitting an image formed on one end face of the optical fibers to the other end face thereof. The light emitting element 82 is realized by employing a small-size light source such as a chip-type light emitting diode (LED) for emitting a white light. The light emitting element 82 is fixed in the vicinity of the surroundings imaging lens system 20 within the housing 10 and is switched on by an external control signal to illuminate an entire surface of the transparent substrate 31. Furthermore, a portion of the surface of the housing 80, which portion faces the housing 10, serves as a light absorbing face 81. Moreover, in FIG. 4, although the surroundings imaging lens system 20 is depicted as one lens, the surroundings imaging lens system 20 may be constructed by combining a plurality of lenses.

The optical system including the area image sensor 30 and the fiber collection member 70 will be described in detail below. As shown in FIG. 6, the fiber collection member 70 is bonded to the area image sensor 30 via the adhesion layer 59. The area image sensor 30 has a transparent substrate 31 provided therein, a light shielding layer 32 formed on a part of the transparent substrate 31 and an interlayer insulation film 33 formed on the transparent substrate 31 and the light shielding layer 32. A thin film transistor 40 is formed on a portion of the interlayer insulation film 33, the portion being positioned directly above the light shielding layer 32, and photosensitive elements 50 is formed on a displaced portion of the interlayer insulation film 33, the displaced portion being displaced from the portion directly above the light shielding layer 32, and further, a gate wiring 63, a data wiring 64 and a bias wiring 65 are formed on the displaced portion. Furthermore, a flattening film 56 is formed to cover the thin film transistor 40, the photosensitive elements 50, the gate wiring 63, the data wiring 64 and the bias wiring 65. And, a color filter 57 is formed on the flattening film 56, and a protective layer 58 is formed on the color filter 57, thereby forming the area image sensor 30.

On the protective layer 58 of the area image sensor 30 is provided the adhesion layer 59 and to the area image sensor 30 is bonded the fiber collection member 70 via the adhesion layer 59.

Description will be made below focusing on one of the photosensitive elements 50 of the area image sensor 30 and the vicinity thereof. FIG. 5C illustrates a plan view of the photosensitive element 50 and a peripheral region thereof when the element is viewed from the side of the transparent substrate 31. FIGS. 5A and 5B each illustrate only the components constituting the area image sensor 30 and only the components constituting the fiber collection member 70.

As shown in FIG. 5A, the photosensitive element 50 has a plurality of rectangular openings 54 formed therein. A thin film transistor 40 is connected to the photosensitive element 50 and those active elements, i.e., the photosensitive element 50 and thin film transistor 40, are connected to an external drive circuit (not shown) via three kinds of wirings (the gate wiring 63, the data wiring 64 and the bias wiring 65). Light incident on the area image sensor 30 from the side of the transparent substrate 31 transmits through the openings 54. Furthermore, the light is allowed to transmit a region of the transparent substrate on which any one of the photosensitive element 50, the thin film transistor 40 and those wirings is not formed.

Additionally, as shown in FIG. 5B, the end face of the fiber collection member 70 has core sections 71 of optical fibers and a reflecting section 72 formed to cover clads of the optical fibers and a peripheral regions of the clads. The ratio of the area of the core sections 71 to the area of the end face of the fiber collection member 70 is about 50% And, the ratio of the area of the reflecting section 72 to the area of the end face of the fiber collection member 70 is about 50% too. The reflecting section 72 is constructed such that a light absorbing material is melted and bonded onto the clads and the peripheral region thereof, and a material such as aluminum or silver is formed thereon to cover the light absorbing member, thereby achieving high reflectance of about not less than about 95%.

The fiber collection member having such high reflectance at the end face thereof can be formed by, for example, applying a lift-off step, which employs a self-alignment, to the fiber collection member. In more detail, a photoresist is coated on one end face of the fiber collection member and an aluminum thin film is formed thereon by a sputtering method. Then, the photoresist is exposed by inputting light into the other end face of the fiber collection member and only the portions of the photoresist located on the core sections 71 are altered. Thereafter, the altered photoresist is removed together with the aluminum layer formed thereon by a wet etching process, thereby forming the above-mentioned fiber collection member with high reflectance.

As shown in FIG. 5C, a plurality of the core sections 71 are formed to overlap the photosensitive element 50. In this case, even when positional relationship between the photosensitive element 50 and the core sections 71 varies to some extent, a large problem never results. That is, when the area image sensor 30 is bonded to the fiber collection member 70, accurate positional alignment therebetween is not required.

Furthermore, as shown in FIG. 6, in the embodiment, the photosensitive element 50 is realized by employing a photodiode that has an photo conversion layer 52 consisting of hydrogenated amorphous silicon (a-Si: H) or the like, an opaque electrode 51 consisting of chromium or the like and a transparent electrode 53 consisting of indium-tin-oxide (ITO) or the like, in which the photo conversion layer 52 is interposed between the opaque electrode 51 and the transparent electrode 53. As is already described, the photosensitive element 50 has the openings 54 formed therein. Moreover, the embodiment employs a top-gate transistor as the thin film transistor 40 therein, in which a channel layer 42 is formed of polycrystalline silicon (poly-Si). In more detail, the thin film transistor 40 has a channel layer 42, a gate insulation film 43 formed on the channel layer 42 and a gate wiring 63 disposed thereon, in which polycrystalline silicon constituting the channel layer 42 is doped with a doping element in a high concentration. The source/drain layers 41 are formed in the same layer as the channel layer 42 and disposed on both sides of the channel layer 42. Such a top-gate poly-Si thin film transistor has been widely used as an element for driving pixels of a liquid crystal display, an image sensor and the like.

Furthermore, to prevent malfunction due to light incident on the channel layer 42, as is already mentioned, the light shielding layer 32 is formed below the thin film transistor 40 via the interlayer insulation film 33. The thin film transistor 40 and the photosensitive element 50 are connected to external devices via the gate wiring 63, the data wiring 64 and the bias wiring 65. The flattening film 56 is formed on those elements to make a surface located above those elements flattened and the color filter 57 and the protective layer 58 are formed thereon. The area image sensor 30 thus formed is bonded to the fiber collection member 70 via the adhesion layer 59. The transparent substrate 31 consists of non-alkali glass. Because the non-alkali glass is compatible with manufacturing process of the poly-Si thin film transistor and the hydrogenated amorphous-silicon photodiode.

The above-described explanation will be more concretely shown by numerical values. For example, thickness of the transparent substrate 31 is 0.7 mm, the aggregate thickness corresponding to the components ranging vertically from the light shielding layer 32 to the flattening film 56 is 1 to 2 µm, thickness of the color filter 57 is 1 to 3.5 µm, thickness of the adhesion layer 59 is about 10 µm, and thickness of the fiber collection member 70 is 0.5 to 1.0 mm. In addition, lateral dimension of those components, i.e., dimension thereof parallel to the surface of the transparent substrate 31 is as follows. Interval at which the photosensitive elements 50 are disposed is 30 µm, width of the opening 54 is 4 µm, and diameter of the core section 71 of the fiber collection member 70 is 10 µm. The number of pixels of the area image sensor 30 is expressed by 500 by 500, and length of one side of pixel area of the area image sensor 30 and length of one side of the fiber collection member 70 each are about 15 mm. Diameter of the housing 10 shaped like a cylinder is 20 mm, which is a little bit smaller than a thickness of a portable telephone and a notebook personal computer.

Now, the operation of the electronic equipment incorporating therein the above-described imaging device for imaging the surroundings will be described. As shown in FIG. 4, light from a landscape, a person or the like is focused by the surroundings imaging lens system 20 onto a plane in which the photosensitive elements 50 of the area image sensor 30 are formed.

The above-stated focusing operation will be explained in detail below. As shown in FIGS. 5A through 5C and FIG. 6, light from the surroundings transmits from a location below the transparent substrate 31, i.e., the side of the surroundings imaging lens system 20, to a location thereabove, i.e., the side of the fiber collection member 70, while a part of the light transmits through the openings 54 to the color filter 57. Furthermore, another part of the light transmits through a region of the area image sensor 30, which is not occupied by either the thin film transistor 40, the photosensitive element 50 or the wirings 63 through 65, to the color filter 57. The color filter 57 allows specific light having a predetermined wavelength range to transmit therethrough and absorbs light other than the specific light. The light having transmitted through the color filter 57 transmits through the adhesion layer 59 to the fiber collection member 70 and a part of the light is reflected by the reflecting section 72 (refer to FIG. 5B), and the remaining part thereof is incident on the core section 71. The light reflected by the reflecting section 72 again transmits through the adhesion layer 59, the color filter 57, etc., and then, is detected by the photosensitive elements 50. Thus, a part of the light incident on the surroundings imaging lens system 20 is focused onto a plane in which the photosensitive elements 50 of the area image sensor 30 are formed. On the other hand, the light incident on one end of the core section 71 exits from the other end thereof and is absorbed by a light absorbing face 81 provided in the housing 80. The light absorbed by the light absorbing face 81 and the light having not transmitted through the area image sensor 30 cannot be utilized for imaging an object and therefore, contribute to loss.

It should be noted that in FIGS. 3 and 4, although the housing 10 is disposed such that the optical axis of the surroundings imaging lens system 20 becomes perpendicular to the front face of the housing 80, as is already mentioned, making the housing 10 rotate with respect to the housing 80 allows the imaging device to capture the image of the surroundings corresponding to various directions. Furthermore, forming the color filters 57, which represent a plurality of colors, for example, red, green and blue, in the area image sensor 30 allows the imaging device to capture color images.

Figure 7A:
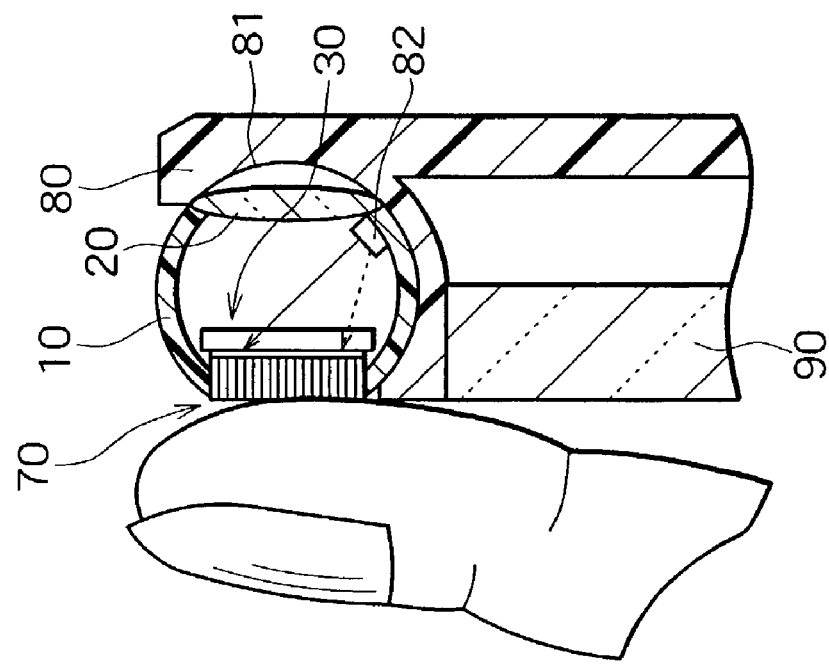
FIG. 7A is a front view showing how operation for capturing the image of fingerprint is performed in the electronic equipment of the first embodiment and FIG. 7B is a cross sectional view thereof.
Figure 7B:
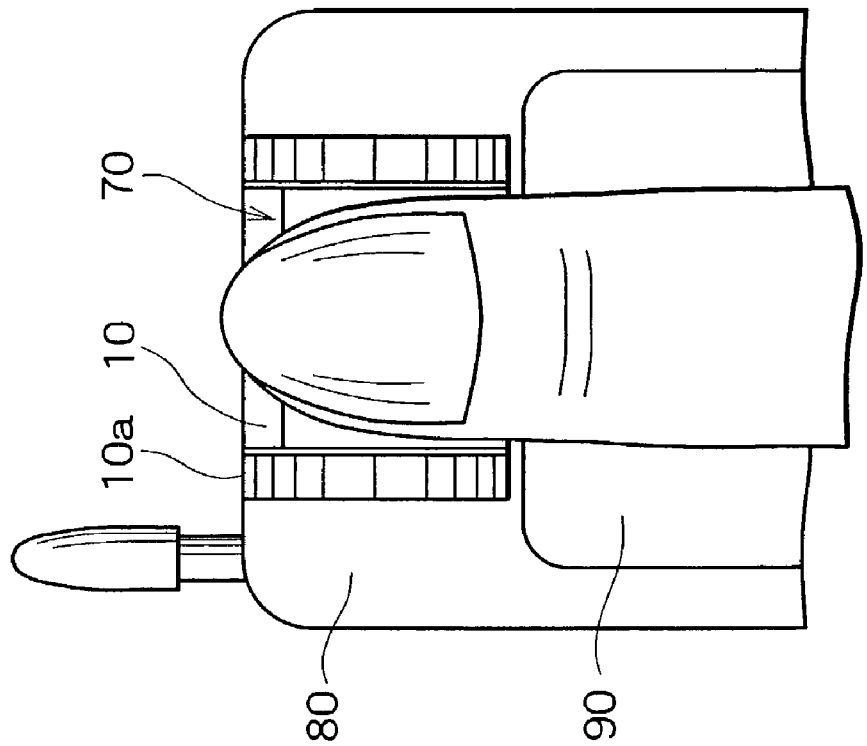

The operation of the electronic equipment for imaging a fingerprint will be described. As shown in FIGS. 7A and 7B, the housing 10 is made to rotate 180 degrees with respect to the orientation thereof shown in FIG. 3 to make the opening 12 of the housing 10 align with the opening 83 of the housing 80, thereby exposing the fiber collection member 70 to the outside. Operation for imaging a fingerprint is performed in a situation where a finger is tightly resting on the end face of the fiber collection member 70 and the light emitting element 82 is being turned on. Light from the light emitting element 82 approximately uniformly illuminates the area image sensor 30.

Referring again to FIGS. 5A through 5C and FIG. 6, a light path along which the light passes will be explained. Light emitted from the light emitting element 82 (refer to FIG. 4) and incident from a location below the transparent substrate 31 transmits through the openings 54, the color filter 57, etc., to the fiber collection member 70. A part of the light is reflected by the reflecting section 72 and the remaining part thereof is incident on the core section 71. In this case, the light incident on the core sections 71 illuminates the finger tightly resting on the other end of the fiber collection member 70. The light reflected or scattered by the finger transmits through the same core sections 71 in a direction opposite to the direction in which the illumination light transmits and through the color filter 57, etc. It is detected by the photosensitive element 50. The intensity distribution of the light thus detected represents the image of the fingerprint. On the other hand, a part of the light reflected by the reflecting section 72 reaches the photosensitive element 50 and produces an output of the area image sensor 30, indicating a constant intensity distribution of light. Thus, the output of the area image sensor 30 consists of a component of light representing the image of fingerprint and a component of light having a constant intensity distribution. Accordingly, an image of fingerprint having high and sharp image contrast is obtained after removing the latter component from the output in subsequent image processing.

It should be noted that the image of fingerprint thus obtained is a color image. A monochrome image of fingerprint may be adequate for an identification algorithm to verify a person seeking authentication. However, when the imaging device is required to have ability to verify whether an object pressed against the fiber collection member is a true finger or not, the imaging device preferably utilizes a color image of fingerprint because it is able to detect changes of color of a finger when the finger is pressed against the fiber collection member.

Furthermore, in the above-described process for imaging a fingerprint, making the display 90 display a message prompting a user to input his/her fingerprint and a graphic symbol indicating location of finger allows the user to accurately determine where to position his/her finger.

As described above, the imaging device 5 of the embodiment is constructed such that the surroundings imaging lens system 20 and the area image sensor 30 formed on the transparent substrate 31 and further, the fiber collection member 70 are rotatably disposed in the housing 10, and therefore, the electronic equipment does not need to have two independent focus optical systems each for capturing the surroundings and a fingerprint. Moreover, since operation for switching the objects to be imaged, i.e., the surroundings and a fingerprint, is performed by making the housing of the imaging device rotate with respect to the housing of the electronic equipment, the electronic equipment is not required to secure a space within the equipment for mechanically switching locations of components necessary to image the objects, which is secured in the conventional electronic equipment. Accordingly, the imaging device of the embodiment has a small volume in comparison with the conventional imaging device and can advantageously be mounted in a portable electronic equipment.

Furthermore, the electronic equipment constructed in accordance with the conventional technique probably has the following drawbacks. That is, a user forcibly feels the image formed on the display is deeply located within the equipment and the residual fingerprint image left on the finger rest prism deteriorates the display quality. However, the electronic equipment constructed in accordance with the embodiment solves the above-mentioned drawbacks by making an imaging mechanism independent of the display.

Additionally, when focusing on operation for imaging the surroundings such as a landscape and a person, the conventional electronic equipment captures the image of the surroundings in only one direction which is uniquely determined by orientation of the electronic equipment. The invented electronic equipment is able to capture the image of the surroundings in a number of directions regardless of orientation of the electronic equipment because an imaging unit can be made to rotate with respect to the housing of the electronic equipment. This means that the electronic equipment of the present invention has high degree of freedom in selecting directions in which the imaging device captures the image of the surroundings. This construction of electronic equipment makes the following operation easily enabled. That is, for example, a user of the electronic equipment communicates with a person on the other end while viewing his/her face using a portable telephone or while sending information indicating moving image of a landscape, a person and/or the like.

It should be appreciated that in the embodiment, although an example is described in which an imaging device capable of imaging both the surroundings and a fingerprint is incorporated in an end portion of a housing of portable telephone, the electronic equipment to be constructed in accordance with the embodiment is not limited to a portable telephone, but may be, for example, a notebook personal computer or a personal digital assistance. In addition, the location in which such imaging device is to be mounted is not limited to an end portion of electronic equipment. For example, in a folding portable telephone and the notebook personal computer, the imaging device may be incorporated in a part of a hinge section for coupling a first housing for housing a display therein and a second housing for housing a keyboard and push buttons therein.

Moreover, the kind of image of object in contact with the fiber collection member is not limited to a fingerprint. In the embodiment, the area of an end portion of the fiber collection member is limited to 15 mm squares. When the end portion of the fiber collection member is made larger, the invented electronic equipment is able to capture a large image. An image valuable to be inputted to a computer or the like also exists other than a fingerprint. For example, a user can input the image of a stamp using a portable telephone to verify whether or not the stamp is authentic.

Additionally, without departing from the spirit and scope of the objects of the present invention, selection and replacement of various components constituting the electronic equipment may be made to and in the above-described embodiment. For example, although the embodiment employs an amorphous-silicon photodiode, shown in FIG. 6, as a photosensitive element of an area image sensor, the photosensitive element is not limited to the amorphous-silicon photodiode. For example, even an electronic equipment employing a photoconduction type element as a photosensitive element therein may realize a function similar to that achieved in the above-described embodiment.

Figure 8:
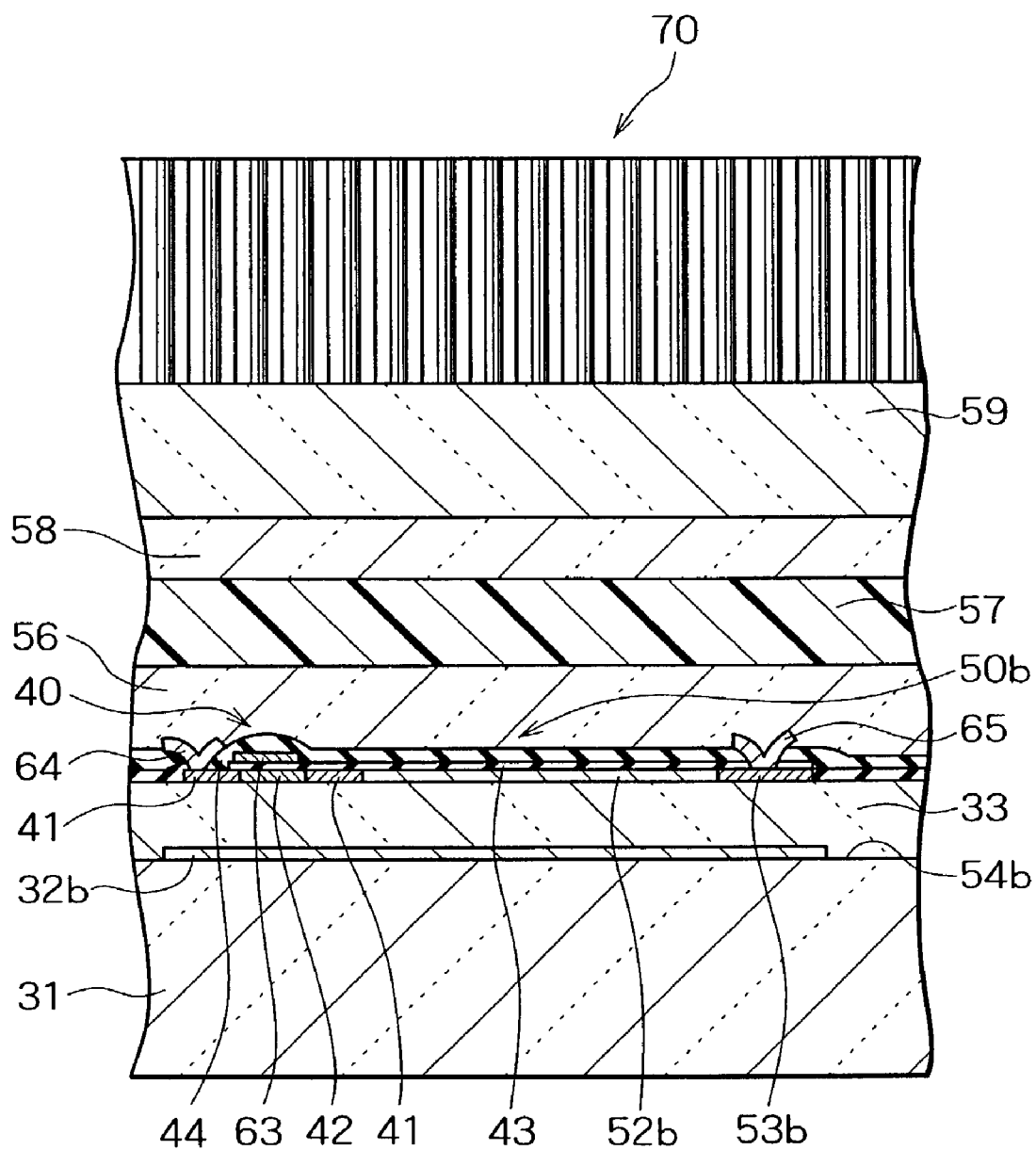
FIG. 8 is a cross sectional view showing an area image sensor and a fiber collection member of a variation of the first embodiment.

A variation of the embodiment will be explained below. FIG. 8 is a cross sectional view showing an area image sensor and a fiber collection member constructed in accordance with the variation. As shown in FIG. 8, in the variation, a photoconduction photosensitive element 50b is formed therein instead of the photosensitive element 50 of the above-described first embodiment. The photoconduction photosensitive element 50b is constructed such that source/drain layers 41 and 53b having a high impurity concentration are disposed on both sides of a photo conversion layer 52b. In addition, a light shielding layer 32b is formed between a transparent substrate 31 and an interlayer insulation film 33 below the photosensitive element 50b. Construction of the electronic equipment of the variation other than the above-described construction is the same as that of the electronic equipment of the above-described first embodiment. The photo conversion layer 52b and the source/drain layer 53b can be formed together with a channel layer 42 and the source/drain layer 41 of a thin film transistor 40, respectively. A bias wiring 65 for applying a certain voltage to the photosensitive element 50b can also be formed together with elements formed in the process steps for forming the thin film transistor 40.

Now the operation of the electronic equipment of the variation will be described. Even when imaging any one of the surroundings and a fingerprint, light is finally incident on the photo conversion layer 52b after transmitting through a color filter 57. The photo conversion layer 52b increases its electrical conductance owing to electrons and holes generated by light, passing a current between the source/drain layer 53b and the source/drain layer 41. An amount of electrical charges obtained by integrating this current is far greater than an amount of electrical charges generated directly by optoelectronic conversion. While, in a photodiode, an amount of electrical charges to be outputted therefrom never exceeds an amount of electrical charges generated by incident light. Therefore, in the variation using the photoconduction photosensitive element 50b, an external electrical circuit can be simplified than an external electrical circuit in the first embodiment using the photodiode. But the input range of the photoconduction photosensitive element, in which proportional relationship between an amount of incident light and an amount of electrical charges to be outputted is maintained, is narrower than that of the photodiode.

As described above, the imaging device having the photoconduction photosensitive element as the photosensitive element can realize the function similar to that of the imaging device having the photodiode as the photosensitive element. The input/output characteristics of the photoconduction photosensitive element as the photosensitive element is inferior in linearity compared to that of the photodiode. But the photoconduction photosensitive element advantageously allows manufacturing steps associated therewith to be simplified and further, permits the external electrical circuit to be simplified.

It should be noted that in the above-stated first embodiment and the variation thereof, although a top-gate poly-Si thin film transistor is employed as a circuit element for driving a photosensitive element, instead, various thin film transistors including a staggered poly-Si thin film transistor or an amorphous silicon thin film transistor, or various diode elements can also be employed. Therefore, those constructions of electronic equipment are included in the present invention.

Figure 5:
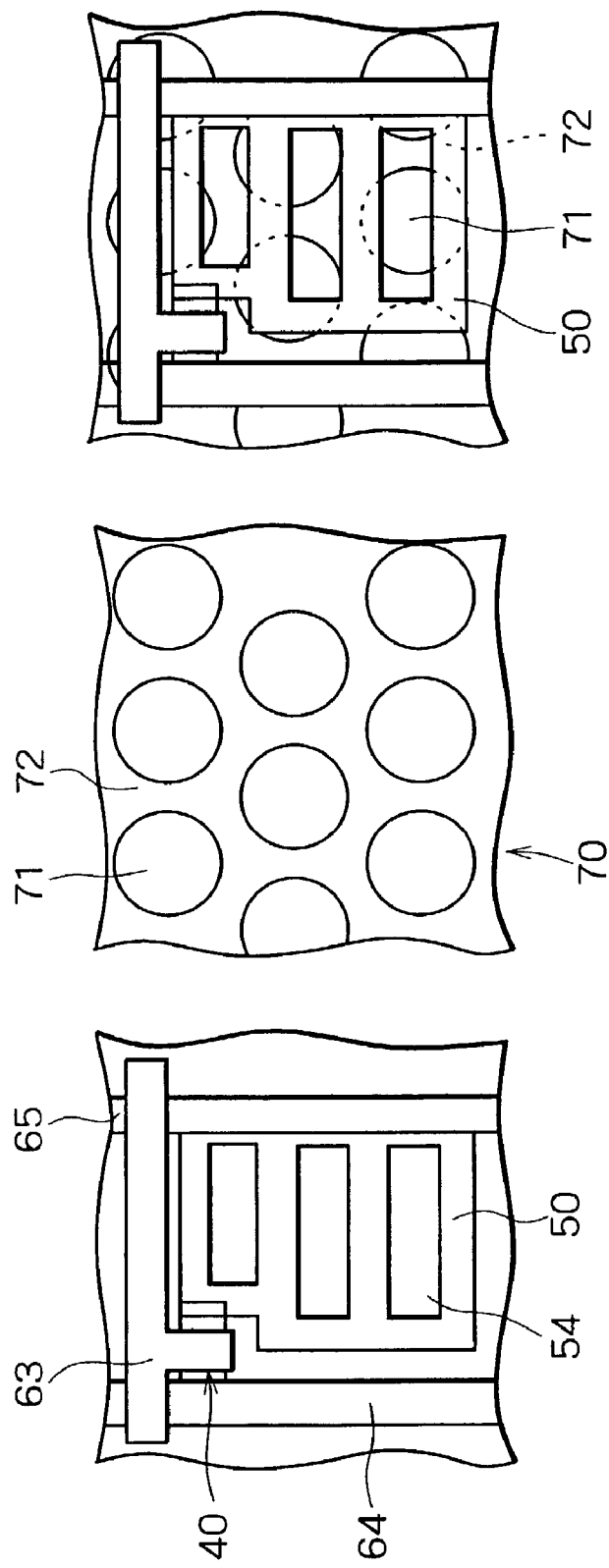
FIG. 5A is a plan view showing a photosensitive element 50 of the imaging device of the first embodiment and the vicinity thereof.
FIG. 5B is a plan view showing an end face of a fiber collection member.
FIG. 5C is a view obtained by overlapping FIG. 5A and FIG. 5B each other.
Figure 6:
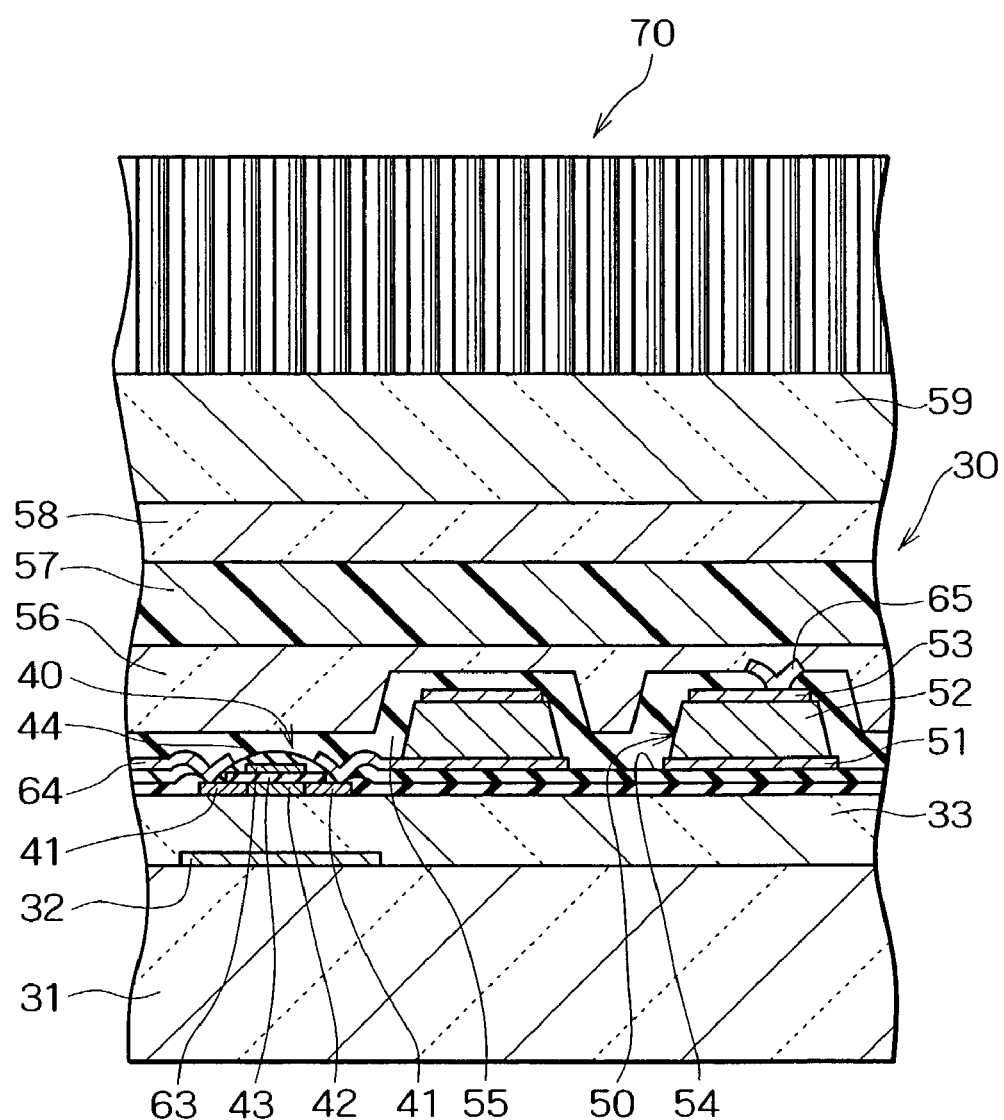
FIG. 6 is a cross sectional view showing an area image sensor and the fiber collection member of the imaging device of the first embodiment.

Furthermore, in the above-stated first embodiment, as shown in FIG. 5, the most simplified construction in which a pixel of an area image sensor consists of a photosensitive element and a thin film transistor is described. However, "CMOS sensor" used in a digital still camera or the like generally employs an "active type" circuit configuration therein in which an amplification circuit is provided in each pixel. Since such an active-pixel CMOS sensor is normally formed on a crystalline silicon substrate, it cannot be used as it is in the present invention that requires transparency of the substrate. However, it is possible to form an electrical circuit equivalent to an active-pixel CMOS sensor on a transparent substrate by utilizing thin film semiconductor process for forming the above-described amorphous silicon or polysilicon thin film transistor. Accordingly, an electronic equipment employing such an active-pixel image sensor therein is also included in the present invention.

Moreover, although the embodiment employs an LED for emitting white light as a light emitting element, a monochrome image of a fingerprint may be adequate for an identification algorithm to verify a person seeking authentication. If so, the light emitting element is not required to emit white light and, for example, may be realized by employing a green LED whose emission peak wavelength is around 550 nm.

In addition, in the embodiment, although an example in which a fiber collection member is provided as optical unit for allowing a finger to tightly rest thereon is described, the following construction as optical unit for allowing an object to tightly rest thereon can be employed in the present invention, producing effects similar to the case where a fiber collection member is employed in the imaging device. That is, an transparent substrate having one region (reflecting region) covered by a reflecting material and the other region (transparent region) not covered by the same arranged in an orderly fashion on the surface thereof is disposed instead of the fiber collection member 70 shown in FIG. 6. The transparent substrate may, for example, be a glass substrate. In this case, the transparent substrate is bonded to the protective layer 58 of the area image sensor 30 so that a surface of the transparent substrate, on which surface the reflecting region is formed, faces the area image sensor 30 via the adhesion layer 59. Note that the shape of the reflecting region may, for example, be the same as that of the reflecting section 72 shown in FIG. 5B. Alternatively, the shape of the reflecting region may be the same as that of the core section 71 shown in FIG. 5B or square reflecting regions and square transparent regions are alternately disposed to form a checker board pattern. As described above, the reflecting regions and the transparent regions may be disposed to form various patterns. Furthermore, in order to prevent light from a finger from spreading in a lateral direction while causing deterioration in image resolution, thickness of the transparent substrate is required to be sufficiently thin. When the thickness of the transparent substrate is made equal to or less than an interval at which photosensitive elements are arranged, such deterioration normally does not cause a large problem. For example, in the case of a sensor with resolution of 500 dpi, an interval at which photosensitive elements are arrayed is 50 μm and therefore, the thickness of the transparent substrate is preferably not greater than 50 μm.

Figure 9:
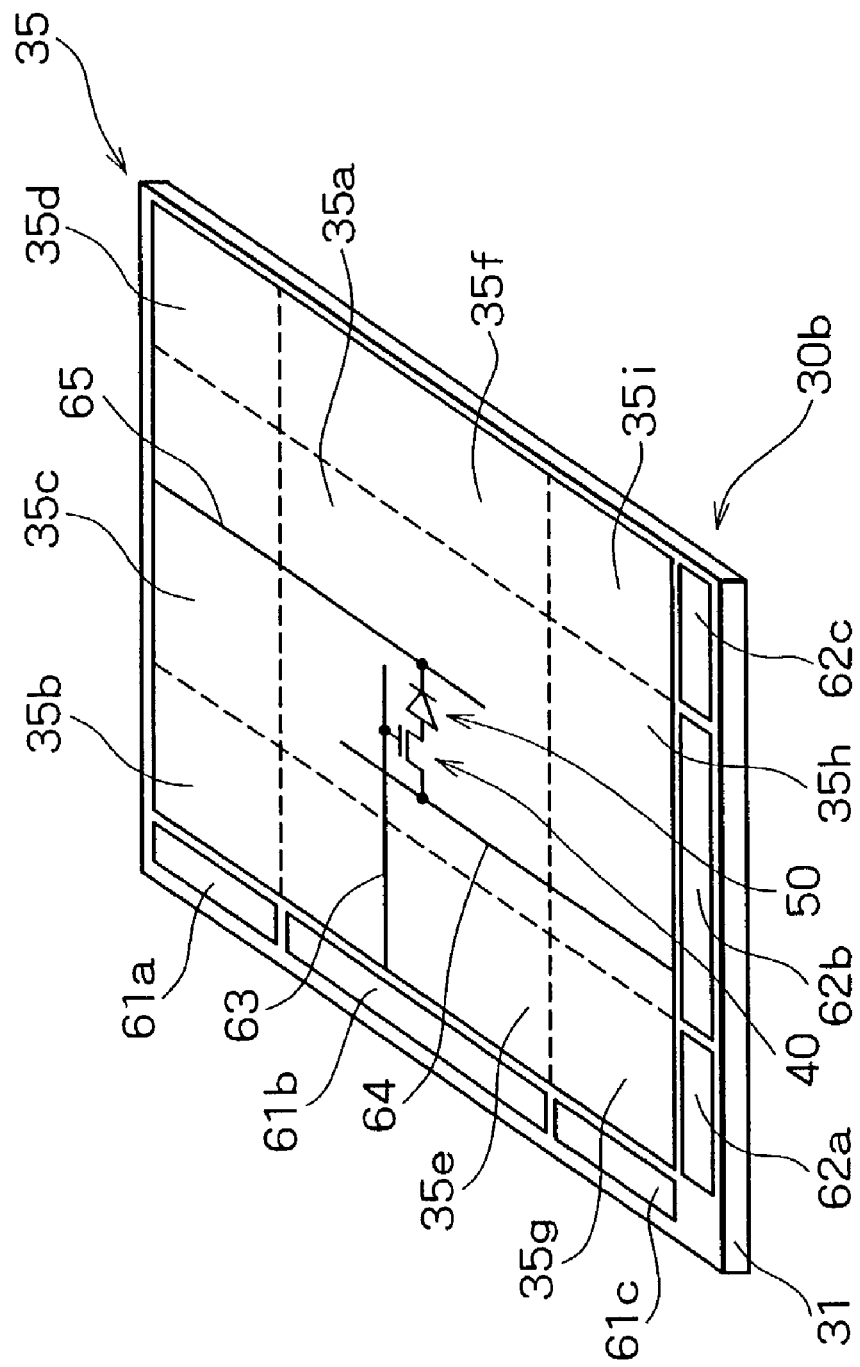
FIG. 9 is a perspective view showing an area image sensor of a second embodiment of the present invention.
Figure 10:
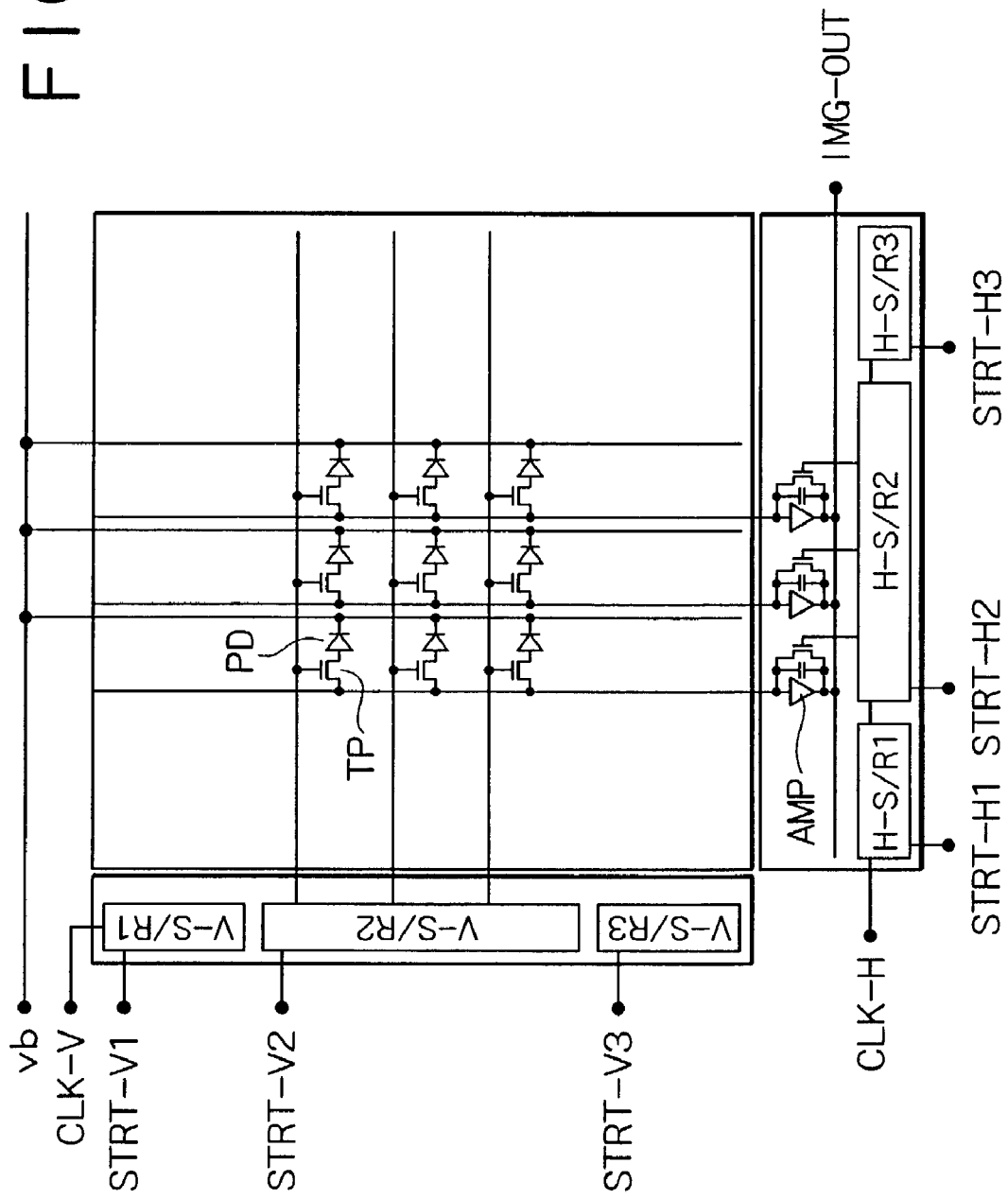
FIG. 10 is a circuit diagram showing the circuit configuration of the area image sensor shown in FIG. 9.

Subsequently, a second embodiment of the present invention will be explained below. FIG. 9 is a perspective view showing an area image sensor employed in the embodiment and FIG. 10 is a circuit diagram showing the circuit configuration of the area image sensor. The present invention achieves distinguished miniaturization in comparison with the conventional imaging device by mounting a surroundings imaging lens system, an area image sensor formed on a transparent substrate and a fiber collection member in a rotatable housing. The above-mentioned first embodiment realizes the rotatable housing 10 with a diameter of about 2 cm when employing the area image sensor 30 with a 15 mm square pixel area and 500 by 500 pixels.

However, one of primary reasons preventing an imaging device from further reduction of its volume is a focal length of a surroundings imaging lens system. That is, assuming that the imaging device shown in FIG. 4 employs a surroundings imaging lens system with a shorter focal length, distance between the surroundings imaging lens system and the area image sensor 30 can be shortened, thereby achieving further miniaturization of the housing 10. However, this construction of imaging device makes resolution of captured images lower since the image of the surroundings is to be focused onto the central region of the area image sensor 30. In addition, since the image is not focused onto the pixels at the peripheral region, outputs of those pixels do not include any information. Even in such a case, these pixels output signals to an external circuit in the same manner as the pixels positioned around the center. This makes the area image sensor take more time than necessary to output image signals and thus a disadvantageous situation arises when a moving image is to be outputted at a high rate. Then, the embodiment employs the following construction for the imaging device would solve the above-mentioned problems and realize further miniaturization.

The embodiment is different from the first embodiment in the configuration of electronic equipment (portable telephone 1). That is, the embodiment employs a surroundings imaging lens system with a shorter focal length, an area image sensor 30b, and a housing with a diameter shorter than that of the housing 10. The remaining configuration thereof is the same as that of the electronic equipment of the first embodiment.

As shown in FIG. 9, the area image sensor 30b of the embodiment has a transparent substrate 31, a group of pixels 35 formed on the transparent substrate 31 by arranging in a matrix a plurality of pixels each consisting of a photosensitive element 50 (refer to FIG. 6) and a thin film transistor 40 (refer to FIG. 6), vertical drive circuits 61a, 61b, 61c formed besides the group of pixels 35 on the transparent substrate 31 for supplying signals necessary to drive those pixels, horizontal drive circuits 62a, 62b, 62c formed besides the group of pixels 35 for amplifying signals outputted from the pixels and supplying the outputted signals to an external circuit (not shown), and wirings, i. e., a gate wiring 63, a data wiring 64, a bias wiring 65, for connecting the pixels and the drive circuits together. In FIG. 9, the parts and components used in the second embodiment and having the same function as those used in the first embodiment are denoted by the same numerals as those referred in the first embodiment, and the detailed description thereof is omitted for simplicity.

In the embodiment, as already described, are provided three vertical drive circuits and three horizontal drive circuits respectively. In accordance with the layout of those drive circuits, i.e., the vertical drive circuits 61a, 61b, 61c and the horizontal drive circuits 62a, 62b, 62c, the group of pixels 35 of the area image sensor 30b are divided into nine rectangle regions 35a through 35i. Accordingly, a plurality of the photosensitive elements 50 each belong to any one of nine rectangle regions 35a through 35i. Note that nine rectangle regions 35a through 35i are disposed to form the three lines and three rows of the matrix structure, and the rectangle region 35a is centrally disposed, and further, the rectangle regions 35b through 35i are disposed in the periphery of the rectangle region 35a. In this case, the rectangle regions 35a through 35i are designed such that an image of the surroundings is focused onto the centrally-located rectangle region 35a by the surroundings imaging lens system 20.

It should be noted that in FIG. 10, the photosensitive element and the thin film transistor are denoted respectively by "PD" and "Tp." "Vb" represents a voltage applied to the photosensitive element "PD" and "IMG-OUT" represents an output of the image sensor. As shown in a circuit diagram of FIG. 10, those drive circuits each include three independent shift register circuits (denoted by "S/R" in the figure). Each shift register circuit outputs rectangular pulses sequentially from the end of its output terminals to the other end thereof immediately after receiving a control signal such as "STRT-V1." "CLK-V" and "CLK-H" are control signals supplied respectively to the vertical drive circuits 61a, 61b, 61c and the horizontal drive circuits 62a, 62b, 62c. Furthermore, the horizontal drive circuits 62a, 62b, 62c each include a circuit (denoted by "AMP") for integrating current outputted from the photosensitive element "PD" and amplifying the integrated current.

The operation of the electronic equipment of the embodiment will be described with reference to FIGS. 9 and 10. As is already mentioned, when capturing the image of the surroundings, light from the surroundings imaging lens system is collected by the centrally-located rectangle region 35a. The photosensitive elements in the regions other than the rectangle region 35a contain no information about an image. In this case, when inputting control signals "STRT-V2" and "STRT-H2" only to the corresponding centrally-located shift register circuits, the vertical drive circuit 61b and the horizontal drive circuit 62b operate, and then, only the pixels included in the rectangle region 35a sequentially output signals. Since control signals are not inputted to the shift register circuits other than the centrally-located shift register circuits, it means that the photosensitive elements in the regions other than the centrally-located rectangle region substantially never exist. Accordingly, the electronic equipment of the embodiment is able to output the image of the surroundings at a high rate without any waste.

When imaging a fingerprint, light reflected or scattered by a finger reaches an entire pixel area (rectangle regions 35a through 35i) of the area image sensor 30b. In this case, as for operation of the vertical drive circuits, the timings of control signals, "STRT-V1," "STRT-V2," "STRT-V3," are adjusted so as not to cause the overlap of the outputs of the three independent shift register circuits in a time domain. In more detail, for example, after completion of output operation performed by the last stage of the vertical drive circuit 61a, a control signal "STRT-V2" may be inputted to the vertical drive circuit 61b. Thus, the electronic equipment of the embodiment is able to make three independent shift register circuits operate substantially as one shift register circuit. Also as for operation of the horizontal drive circuits, adjusting the timings of control signals allows the electronic equipment of the embodiment to make three independent shift register circuits operate substantially as one drive circuit. Accordingly, the electronic equipment of the embodiment is able to acquire the image of a fingerprint after signals are outputted from all of the pixels of the area image sensor 30b.

As described above, since the electronic equipment of the embodiment is able to make only pixels corresponding to a desired region of the area image sensor output signals by dividing the area image sensor, the electronic equipment can output the image of the surroundings without any waste even when distance between the surroundings imaging lens system and the area image sensor is made shorter, achieving further miniaturization of imaging device and electronic equipment incorporating therein the same.

It should be noted that the number of regions obtained by dividing the pixel area of the area image sensor is not limited to nine. For example, establishing a mechanism capable of switching two different lens systems as a surroundings imaging lens system makes it possible to add "Operation for taking detailed close-ups" to the electronic equipment, for example, for imaging an object close to a lens in addition to a normal operation for capturing the image of the surroundings. In this case, the electronic equipment is required to capture three sizes of images, i. e., the image of the surroundings, the image of the surroundings at the time of operation for taking detailed close-ups and the image of fingerprint. This function can be realized by dividing two drive circuits respectively into 5 sub drive circuits and further, dividing a pixel area into 25 sub pixel areas. Therefore, the imaging device having such a configuration is included in the present invention.

Thereafter, a third embodiment of the present invention will be explained below. In the imaging device of the present invention, the usability of light is a critical factor to determine quality of an image to be displayed and therefore, it is preferable to make the light utilization efficiency as high as possible. Then, turning back to the first embodiment, the light utilization efficiency will be explained with reference to FIGS. 5A through 5C and FIG. 6. Light incident from the side of the transparent substrate 31 transmits through the openings 54 of the photosensitive element 50 and regions in which the photosensitive element 50, the thin film transistor 40 and the wirings 63 to 65 are not formed. Those regions allowing the light to transmit therethrough are assumed to exhibit a transmittance "Y1." Thereafter, the light transmits through the color filter 57. The color filter 57 allowing the light to transmit therethrough is assumed to exhibit a transmittance "T2." The light having passed through those associated regions or components that exhibit a transmittance "T1×T2" and having reached the end face of the fiber collection member 70 is reflected by the reflecting section 72 or incident on the core section 71. Assume probability of occurrence of the former case where the light is reflected by the reflecting section 72 is represented by "T3." Assume probability of occurrence of the case where the light reflected by the reflecting section 72 again transmits through the color filter 57 to the photosensitive element 50 is represented by "T4." Consequently, the light utilization efficiency is calculated by multiplying the probabilities T1 through T4, i. e., "T1×T2×T3×T4". The product "T1×T4" never exceeds 0.25. In addition, if the probability "T3" is made greater than 0.5, the usability of light at the time of operation for imaging a fingerprint is reduced. Therefore, in such a case, the first embodiment suffers from difficulty in increasing the usability of light.

Figure 11:
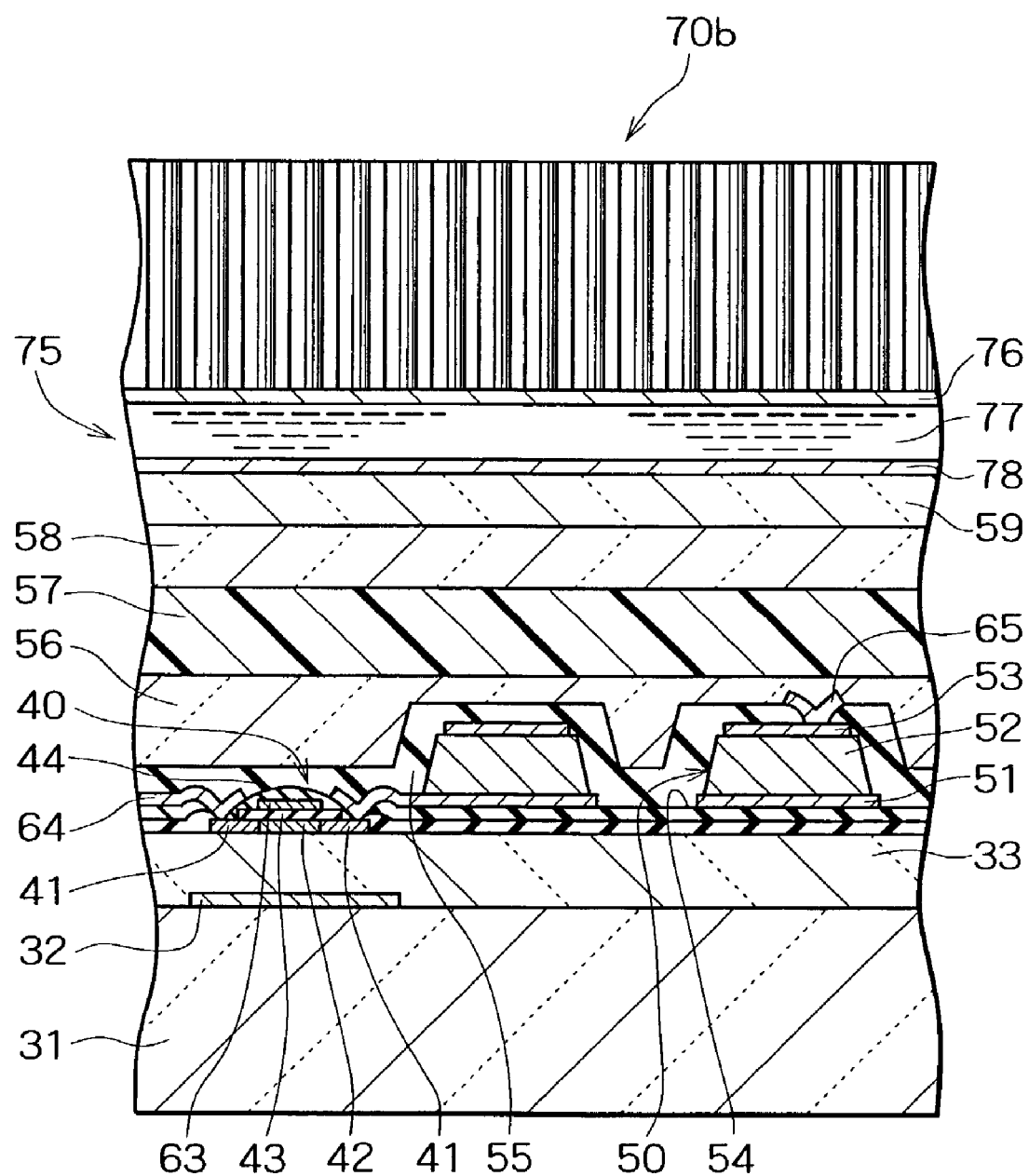
FIG. 11 is a cross sectional view showing an area image sensor of a third embodiment of the present invention.

Then, the configuration of electronic equipment as a third embodiment for solving the above-described problems and improving the usability of light will be explained. FIG. 11 is a cross sectional view showing an area image sensor of the embodiment. Note that in FIG. 11, the parts and components used in the third embodiment and having the same function as those used in the first embodiment shown in FIG. 6 are denoted by the same numerals as those referred in the first embodiment, and the detailed description thereof is omitted for simplicity.

As shown in FIG. 11, the electronic equipment of the embodiment is different from the electronic equipment of the first embodiment shown in FIG. 6 in that the former has a fiber collection member 70b provided therein instead of the fiber collection member 70 of the first embodiment. The fiber collection member 70b has a reflection/transmission switch unit 75 provided on the area image sensor 30 and does not have the reflecting section 72 (refer to FIG. 5B). The reflection/transmission switch unit 75 is formed by laminating a transparent electrode 76, a liquid crystal layer 77 and a transparent electrode 78 in this order. This means that the steps for manufacturing the fiber collection member 70b do not need to include the step for forming the reflecting section 72, but instead, need to include the steps for laminating the transparent electrode 76, the liquid crystal layer 77 and the transparent electrode 78 in this order to form the reflection/transmission switch unit 75. The liquid crystal layer 77 is realized by employing, for example, chiral nematic liquid crystal. The chiral nematic liquid crystal maintains its helically twisted structure when a voltage is not being applied thereto, scattering light incident thereon. When a voltage is applied thereto, the helically twisted structure is extended, allowing light incident thereon to transmit therethrough. The transparent electrodes 76 and 78 are formed by sputtering a material such as an ITO on an entire end face of the fiber collection member 70b.

In the electronic equipment of the embodiment, when imaging the surroundings, a voltage is not applied between the transparent electrodes 76 and 78, making the reflection/transmission switch unit 75 in a reflection mode. This allows the above-stated probability "T3" to be greater than 0.5. On the other hand, when imaging a fingerprint, a voltage is applied between the transparent electrodes 76 and 78, making the reflection/transmission switch unit 75 in a transmission mode. Thus, the electronic equipment of the embodiment is able to increase the usability of light by disposing the reflection/transmission switch unit between the area image sensor and the fiber collection member regardless of whether the surroundings or a fingerprint is imaged.

It should be noted that the reflection/transmission switch unit 75 is not limited to the configuration and the material employed in the embodiment. For example, even in a case where an electronic equipment is constructed such that a liquid crystal (polymer-dispersed liquid crystal) formed by dispersing droplets of liquid crystal in a polymer network is interposed between the two transparent electrodes, the electronic equipment thus constructed produces effects equivalent to those obtained by using the electronic equipment of the embodiment. Alternatively, the electronic equipment of the embodiment may be constructed such that a transparent substrate having a thickness of not greater than 50 μm and including a transparent electrode formed on the surface thereof, and an area image sensor having a transparent electrode formed on the surface thereof interpose a chiral nematic liquid crystal or polymer-dispersed liquid crystal therebetween. Accordingly, the imaging devices having such configurations are also included in the present invention.

Figure 12A:
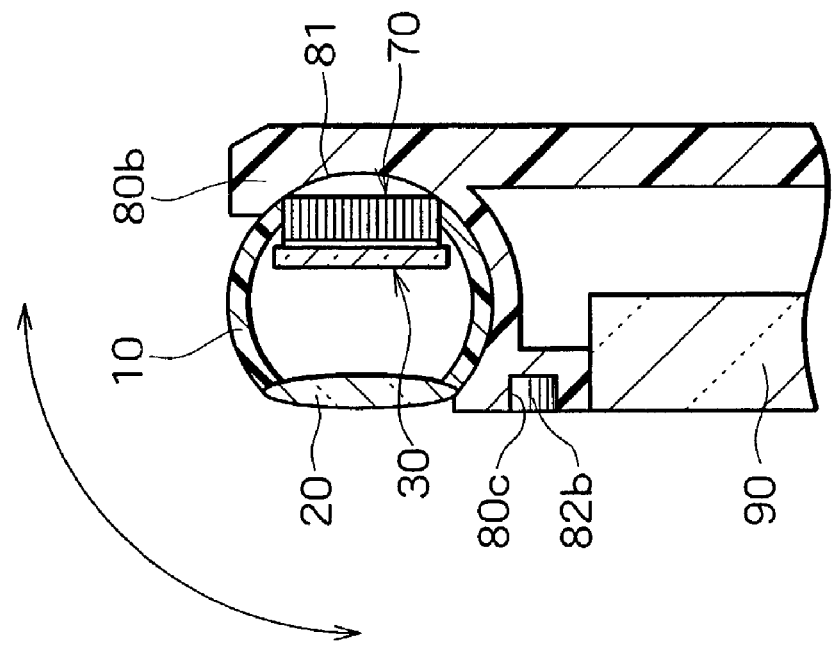
FIG. 12A is a front view showing an electronic equipment of a fourth embodiment of the present invention and FIG. 12B is a cross sectional view showing the electronic equipment.

Subsequently, a fourth embodiment of the present invention will be explained. FIG. 12A is a front view showing an electronic equipment of the embodiment and FIG. 12B is a cross sectional view showing the electronic equipment, and FIG. 13A is a front view showing how a fingerprint is imaged in the embodiment, and FIG. 13B is a cross sectional view showing how a fingerprint is imaged.

In the above-described first embodiment, light needed to image a fingerprint is supplied from the light emitting element 82 (refer to FIG. 4) such as a chip-type LED disposed within the housing 10. However, the location in which the light emitting element is to be disposed is not limited to that employed in the first embodiment.

Figure 12B:
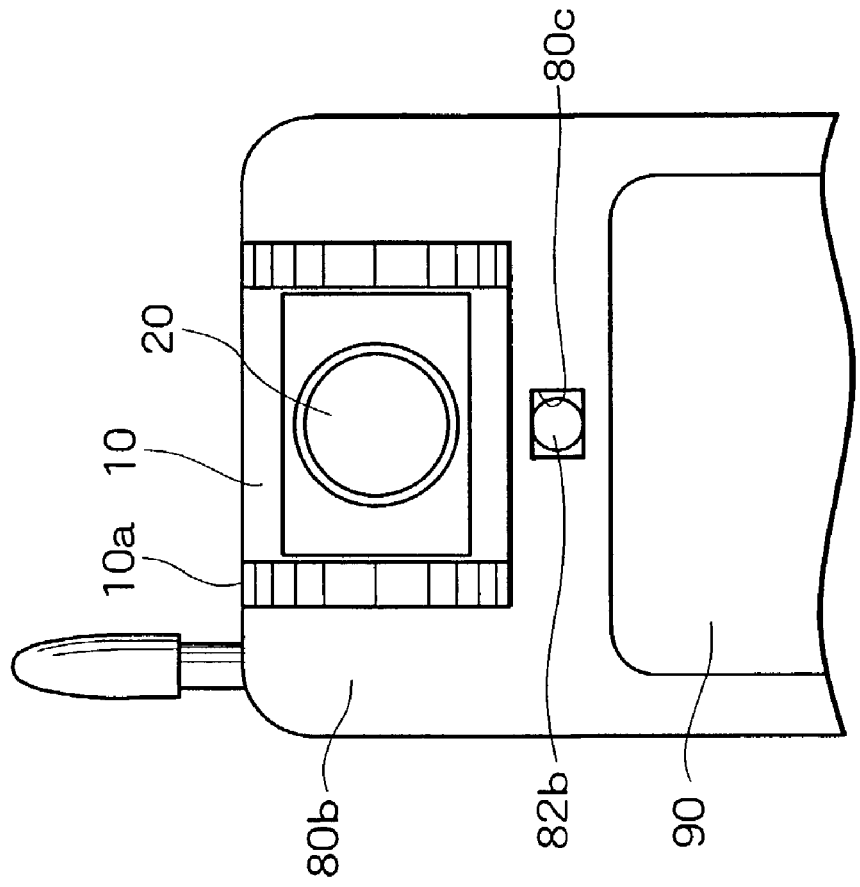

As shown in FIGS. 12A and 12B, the electronic equipment has a light emitting element 82b provided in a housing 80b thereof. A hole 80c for housing the light emitting element 82b therein is provided in the housing 80b and positioned between an display 90 and a surroundings imaging lens system 20, the location of which is aligned with that of the outer face of the housing 80b. The light emitting element 82b is provided within the hole 80c. The light emitting element 82b is disposed such that light therefrom is most effectively incident on a part of a finger when the finger is tightly resting on a fiber collection member 70. Construction of the electronic equipment of the embodiment other than the above-described construction is the same as that of the electronic equipment of the above-described first embodiment.

Now, the operation of the electronic equipment for imaging a fingerprint of the embodiment will be described. As shown in FIGS. 13A and 13B, first, a finger is made to tightly rest on the fiber collection member 70. Then, while the finger is tightly resting thereon, the light emitting element 82b is made to emit light. The light emitted from the light emitting element 82b is incident within the finger through a portion of the finger close to the light emitting element 82b and is repeatedly reflected and scattered, and then, a part of the light is incident on the fiber collection member 70 that is tightly being in contact with the finger. The electronic equipment acquires the image of fingerprint by making the area image sensor 30 detect the distribution of intensity of such light. Except for the above-described operation, operations performed in the embodiment for imaging the surroundings and a fingerprint are similar to those performed in the above-described first embodiment. Since the embodiment need not to make the housing 10 incorporate therein the light emitting element, the housing 10 can be made further smaller.

Figure 14:
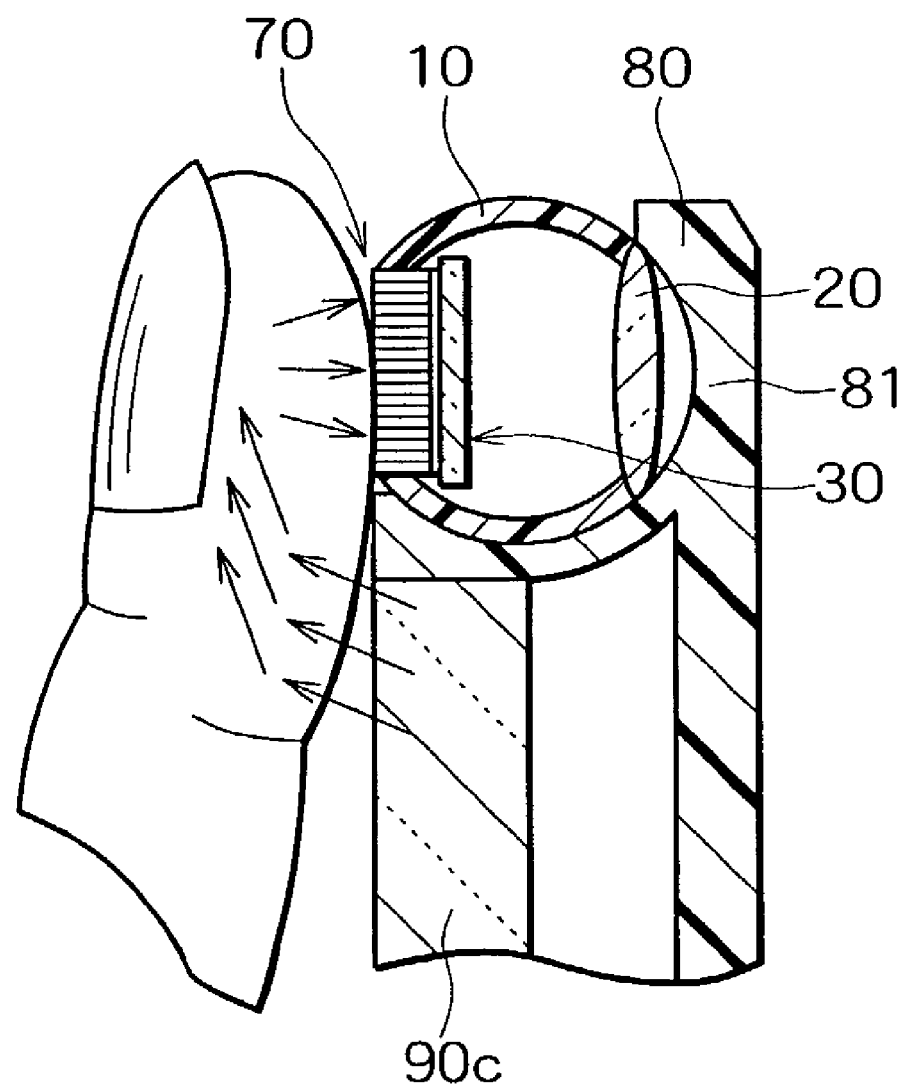
FIG. 14 is a cross sectional view showing an electronic equipment of a variation of the fourth embodiment.

A variation of the embodiment will be explained below. FIG. 14 is a cross sectional view showing an electronic equipment constructed in accordance with the variation. As shown in FIG. 14, the variation does not have a light emitting element independently provided therein and employs an display 90c therein for emitting light as a light source for imaging a fingerprint. This construction enables the following operation. That is, the light emitted from the display 90c is incident within the finger and is repeatedly reflected and scattered, and then, a part of the light is incident on the fiber collection member 70. Thus, the electronic equipment acquires the image of fingerprint. Construction and operation of the electronic equipment of the variation other than the above-described construction and operation are the same as those of the electronic equipment of the above-described fourth embodiment. Since the variation does not to have a dedicated light emitting element, the housing 10 can be made further smaller while the manufacturing cost of electronic equipment can be reduced.

What is claimed is:

1. An imaging device comprising:
   a first housing having a first and second openings provided therein;
   open/close unit that opens and closes said first and second openings;
   focus optical unit for focusing light having passed through said first opening when said first opening is open;
   a plurality of photosensitive elements for detecting light focused using said focus optical unit; and
   contact-type imaging unit for allowing light having passed through said second opening to enter said plurality of photosensitive elements when said second opening is open.

2. The imaging device according to claim 1, wherein said open/close unit is a second housing having a third opening provided therein for housing said first housing within said second housing and rotatably supporting said first housing, and said one of said first and second openings is opened by making said first housing rotate so as to align a location of said one of said first and second openings with a location of said third opening.

3. The imaging device according to claim 1 further comprising
   a transparent substrate provided between said plurality of photosensitive elements and said focus optical unit, wherein said plurality of photosensitive elements are formed on a surface of said transparent substrate.

4. The imaging device according to claim 1, wherein a portion of said open/close unit positioned to close one of said first opening and said second opening is formed of a material capable of absorbing light.

5. The imaging device according to claim 1, wherein said focus optical unit has at least one lens therein.

6. The imaging device according to claim 1, wherein said contact-type imaging unit has a plurality of optical fibers therein.

7. The imaging device according to claim 1 further comprising a reflecting section for reflecting light emitted from said focus optical unit toward said plurality of photosensitive elements.

8. The imaging device according to claim 7, wherein said reflecting section is a metal film formed partially on an end portion of said contact-type imaging unit and positioned on a side of said focus optical unit.

9. The imaging device according to claim 1 further comprising a reflection/transmission switch unit for switching operations for reflecting light emitted from said focus optical unit to make said light reach said plurality of photosensitive elements and allowing light emitted from said focus optical unit to transmit through reflection/transmission switch unit to make said light reach said contact-type imaging unit.

10. The imaging device according to claim 9, wherein said reflection/transmission switch unit comprises:
    two transparent electrodes disposed in parallel with each other; and
    a chiral nematic liquid crystal layer disposed between said two transparent electrodes.

11. The imaging device according to claim 1 further comprising a color filter disposed between said contact-type imaging unit and said plurality of photosensitive elements.

12. The imaging device according to claim 1, wherein said plurality of photosensitive elements are divided into a plurality of groups, each group corresponding to one group of locations of said plurality of photosensitive elements, and one of operations for making photosensitive elements belonging to all of said plurality of groups detect light and making photosensitive elements belonging to one of said plurality of groups detect light can be selected.

13. The imaging device according to claim 1 further comprising a light emitting element provided within said first housing, wherein light emitted from said light emitting element transmits through said contact-type imaging unit to illuminate an object to be imaged and light reflected by said object transmits through said contact-type imaging unit to be detected by said plurality of photosensitive elements.

14. The imaging device according to claim 1 further comprising a light emitting element provided in an outer face of said first housing, wherein light emitted from said light emitting element is incident on an object to be imaged and light reflected or scattered by said object transmits through said contact-type imaging unit to be detected by said plurality of photosensitive elements.

15. An electronic equipment incorporating therein said imaging devices described in claims 1.

16. The electronic equipment according to claim 15 is one of a portable telephone, a personal digital assistance and a notebook personal computer.

17. The electronic equipment according to claim 15 further comprising a display unit for displaying an image and in addition, emitting light, wherein light emitted from said display unit is incident on an object to be imaged and light reflected or scattered by said object transmits through said contact-type imaging unit to be detected by said plurality of photosensitive elements.

18. The imaging device according to claim 1, wherein said open/close unit is a second housing for housing said first housing within said second housing, said second housing having a third opening provided therein.

19. The imaging device according to claim 18, said open/close unit aligns a location of said one of said first and second openings with a location of said third opening.

20. The imaging device according to claim 1, further comprising a second housing for housing said first housing within and a light emitting element provided in one of an outer face of said first housing and an outer face of said second housing, wherein light emitted from said light emitting element is incident on an object to be imaged and light reflected or scattered by said object transmits through said contact-type imaging unit to be detected by said plurality of photosensitive elements.

21. The imaging device according to claim 1, wherein said plurality of photosensitive units provided within said first housing.

* * * * *

UNITED STATES PATENT AND TRADEMARK OFFICE
CERTIFICATE OF CORRECTION

PATENT NO. : 7,408,135 B2
APPLICATION NO. : 10/252407
DATED : August 5, 2008
INVENTOR(S) : Ichiro Fujieda Page 1 of 1

It is certified that error appears in the above-identified patent and that said Letters Patent is hereby corrected as shown below:

IN THE TITLE at (54) and above paragraph 1, column 1, lines 1-4;

Delete "IMAGING DEVICE HAVING DUAL OPENING WITH OPEN/CLOSE UNIT AND ELECTRONIC EQUIPMENT INCORPORATED THEREIN THE SAME" and replace with "IMAGING DEVICE AND ELECTRONIC EQUIPMENT INCORPORATED THEREIN THE SAME".

Signed and Sealed this
Fifth Day of July, 2011

David J. Kappos
*Director of the United States Patent and Trademark Office*